(12) United States Patent  
Miyazaki et al.

(10) Patent No.: US 8,689,531 B2  
(45) Date of Patent: Apr. 8, 2014

(54) BAG MAKING AND PACKAGING MACHINE

(75) Inventors: Kiyoshi Miyazaki, Shiga (JP); Masashi Kondo, Shiga (JP); Makoto Ichikawa, Shiga (JP); Takahiro Yasuda, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 508 days.

(21) Appl. No.: 12/995,899

(22) PCT Filed: Jun. 15, 2009

(86) PCT No.: PCT/JP2009/060891  
§ 371 (c)(1),  
(2), (4) Date: Dec. 2, 2010

(87) PCT Pub. No.: WO2009/154175  
PCT Pub. Date: Dec. 23, 2009

(65) Prior Publication Data  
US 2011/0107729 A1    May 12, 2011

(30) Foreign Application Priority Data

Jun. 17, 2008  (JP) .................................. 2008-157526  
Oct. 6, 2008  (JP) .................................. 2008-259767  
May 29, 2009  (JP) .................................. 2009-130745

(51) Int. Cl.  
    *B65B 9/06*    (2012.01)

(52) U.S. Cl.  
    USPC .............. 53/551; 53/552; 53/370.7; 53/371.3

(58) Field of Classification Search  
    USPC ......... 53/552, 64, 370.2, 370.6, 370.7, 371.3, 53/371.6, 551  
See application file for complete search history.

(56) References Cited

U.S. PATENT DOCUMENTS 5,177,930 A * 1/1993 Harston et al. ..................... 53/55  
5,485,712 A * 1/1996 Cherney et al. ................. 53/436  
6,526,733 B1 3/2003 Schellenberg et al.  
(Continued)

FOREIGN PATENT DOCUMENTS

FR    2 866 012 A1    8/2005  
JP    48-14716 B1    5/1973  
(Continued)

OTHER PUBLICATIONS

Extended European Search Report of the corresponding European Application No. 09766623.4, dated Oct. 26, 2011.

*Primary Examiner* — Thanh Truong  
*Assistant Examiner* — Eyamindae Jallow  
(74) *Attorney, Agent, or Firm* — Global IP Counselors, LLP

(57) ABSTRACT

A bag making and packaging machine includes a conveying unit, a transverse sealing mechanism, and a gusset forming mechanism. The conveying unit is configured and arranged to continuously convey a tubular packaging material. The transverse sealing mechanism has a pair of sealing jaws configured and arranged to revolvingly move while following annular loci to seal the tubular packaging material in a transverse direction with respect to a conveyance direction of the tubular packaging material. The gusset forming mechanism has a pair of folding members configured and arranged to be pressed against side portions of the tubular packaging material to form gussets in the side portions of the tubular packaging material while the folding members move along the conveyance direction of the tubular packaging material before the transverse sealing mechanism seals the tubular packaging material.

18 Claims, 28 Drawing Sheets

(56) References Cited

U.S. PATENT DOCUMENTS

| | | | |
|---|---|---|---|
| 6,807,794 B2* | 10/2004 | Ausnit et al. | 53/412 |
| 2002/0162305 A1* | 11/2002 | Miyamoto et al. | 53/551 |
| 2005/0198929 A1* | 9/2005 | Gehring et al. | 53/451 |
| 2007/0084142 A1* | 4/2007 | Matthews | 53/412 |
| 2010/0037567 A1* | 2/2010 | Tsuruta et al. | 53/551 |
| 2010/0101193 A1* | 4/2010 | Iwasa et al. | 53/567 |

FOREIGN PATENT DOCUMENTS

| | | |
|---|---|---|
| JP | 07-156908 A | 6/1995 |
| JP | 08-244705 A | 9/1996 |
| JP | 2007-076719 A | 3/2007 |

* cited by examiner

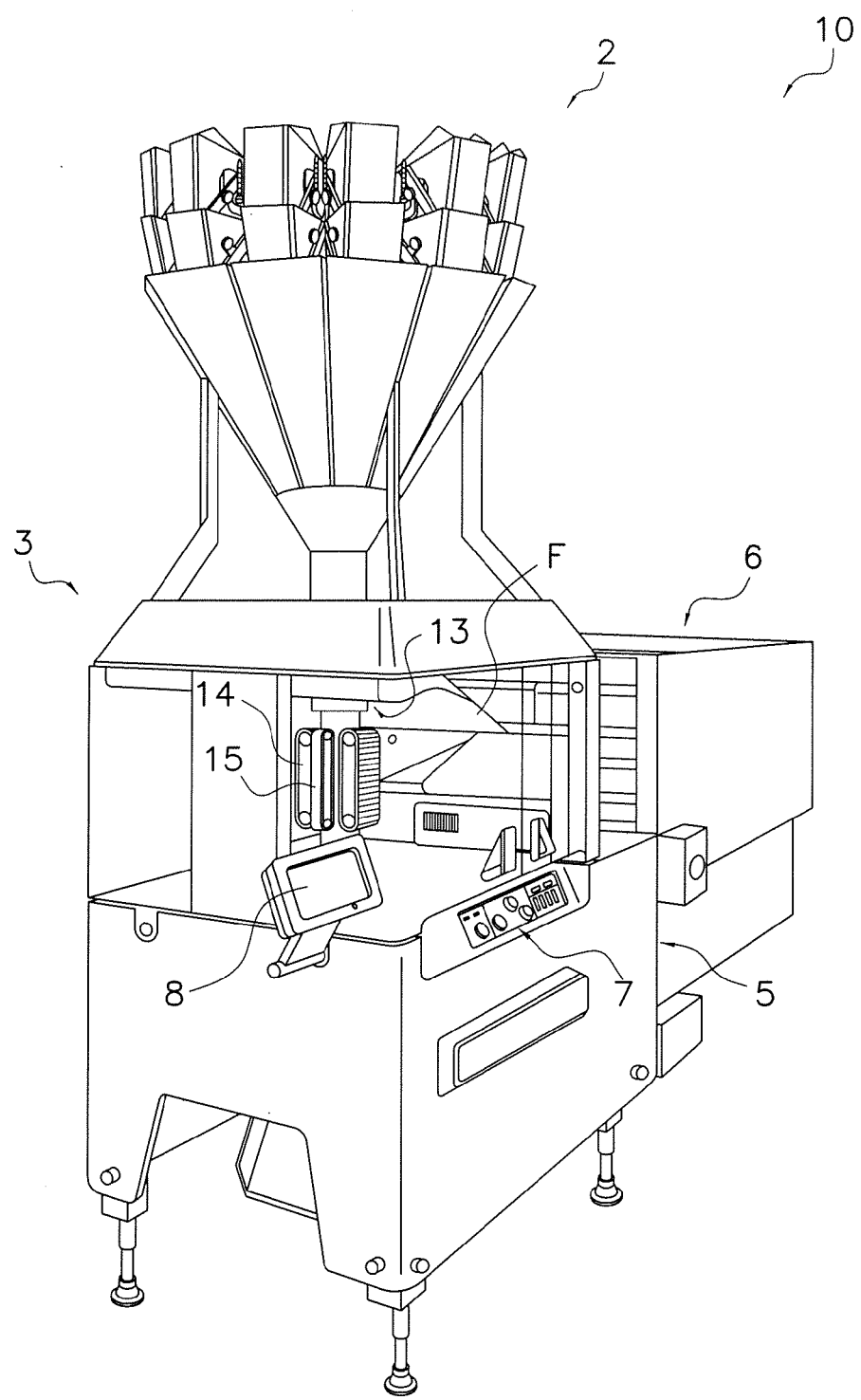
F I G. 1

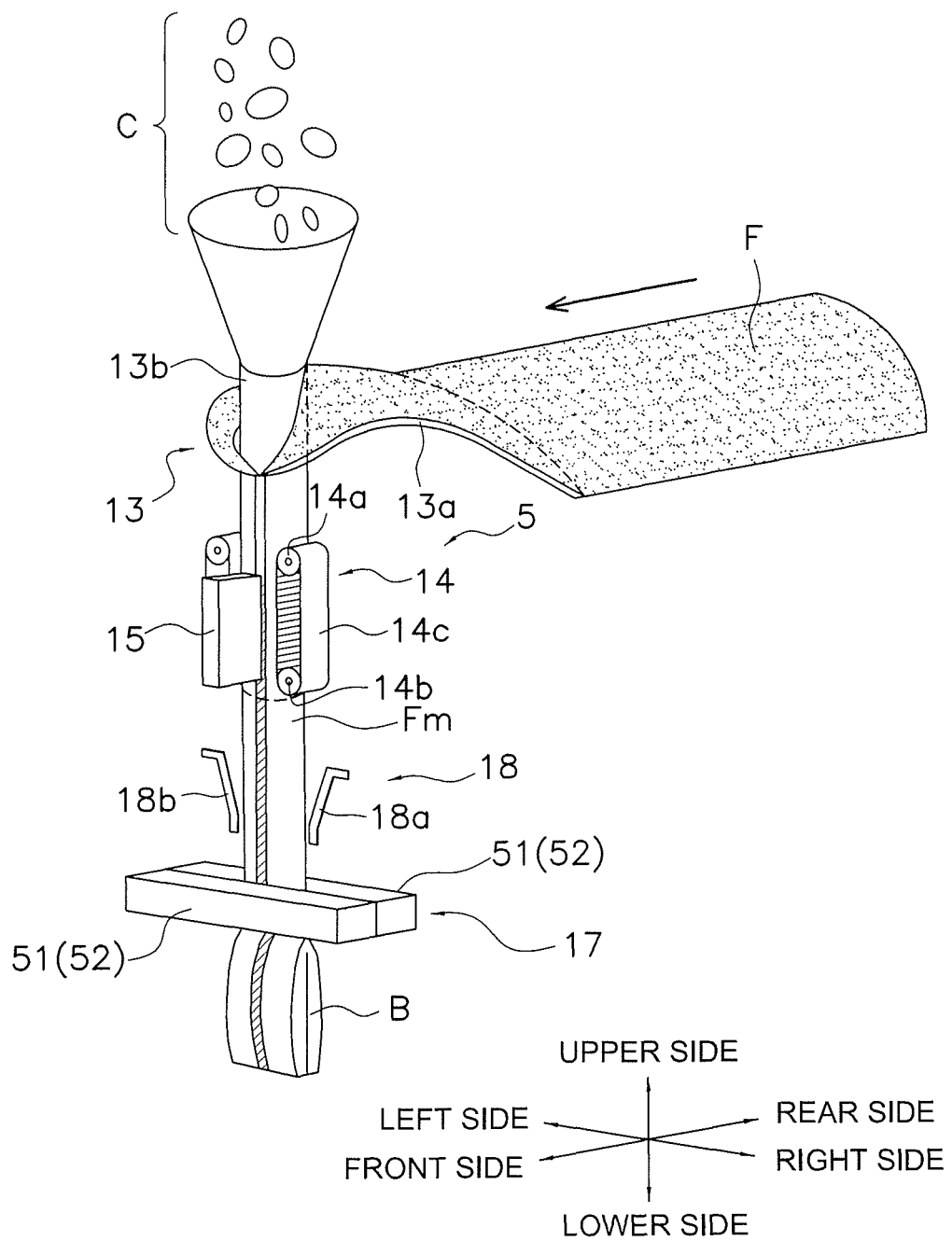
F I G. 2

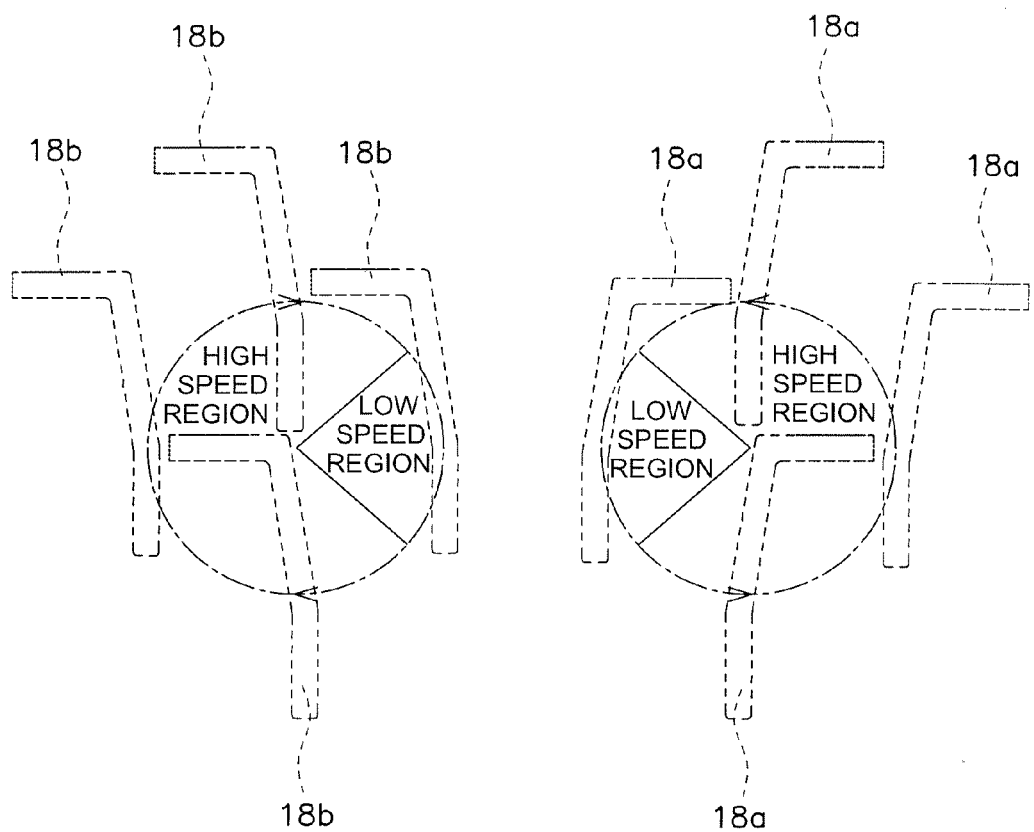
F I G. 6

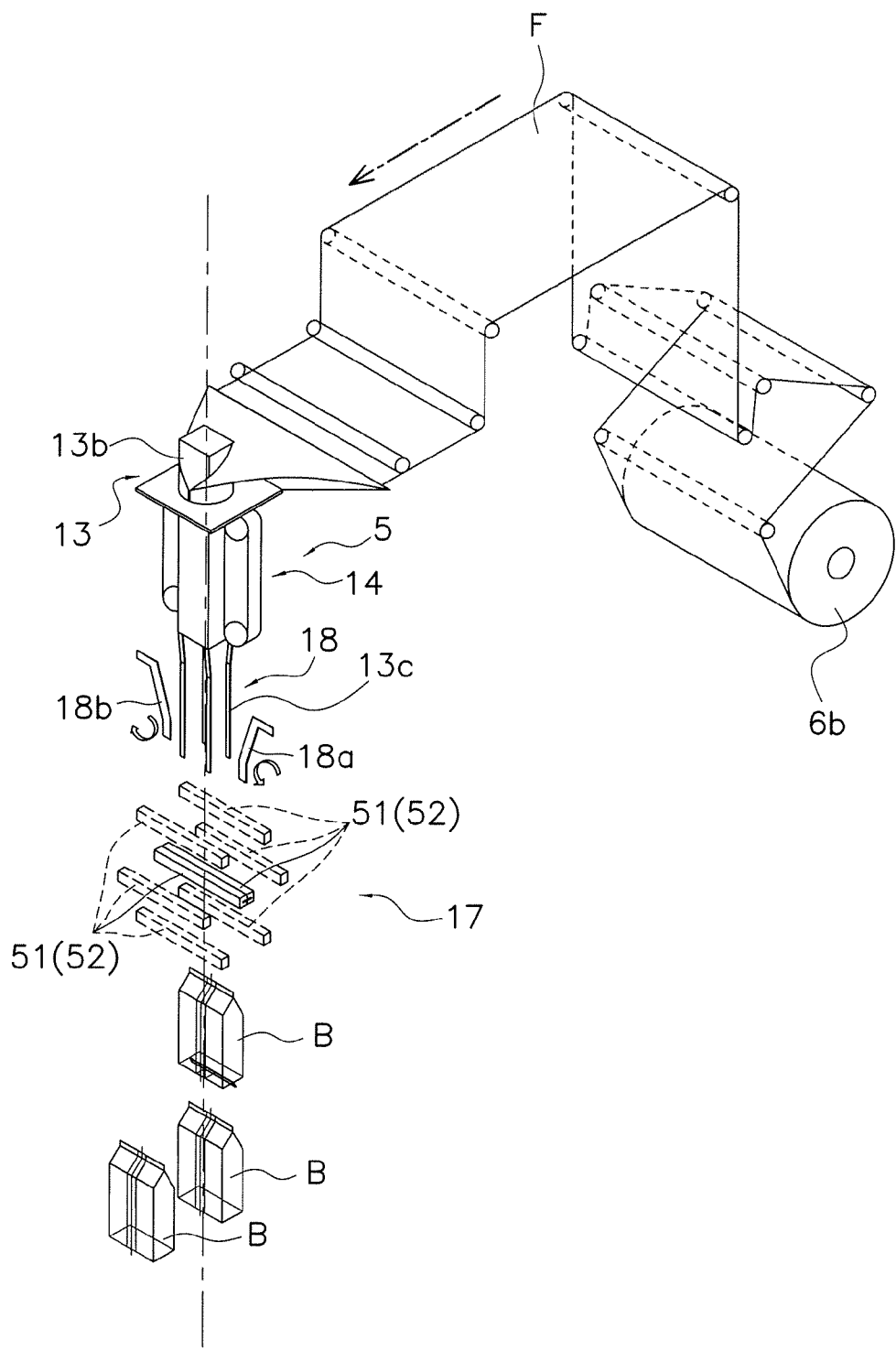
F I G. 8

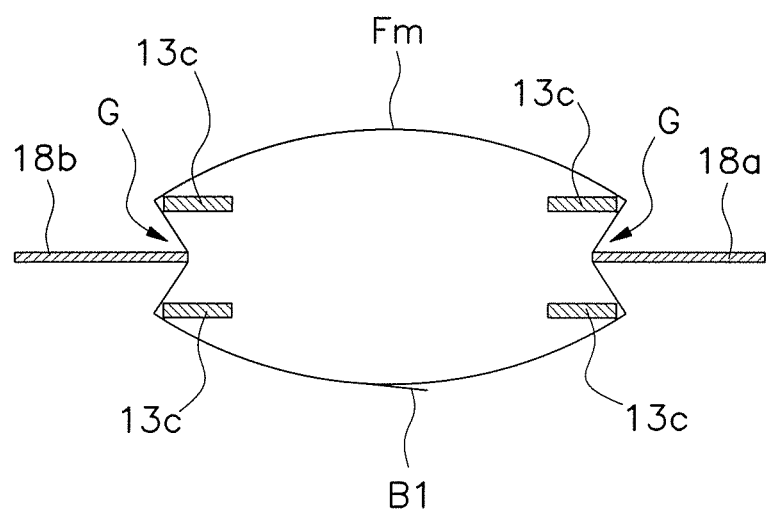
F I G. 9

BAG MAKING AND PACKAGING MACHINE

CROSS-REFERENCE TO RELATED APPLICATIONS

This national phase application claims priority to Japanese Patent Application No. 2008-157526 filed on Jun. 17, 2008, Japanese Patent Application No. 2008-259767 filed on Oct. 6, 2008, and Japanese Patent Application No. 2009-130745 filed on May 29, 2009. The entire disclosures of Japanese Patent Application Nos. 2008-157526, 2008-259767 and 2009-130745 are hereby incorporated herein by reference.

TECHNICAL FIELD

The present invention relates to a bag making and packaging machine that performs bag making while forming gussets (fold portions) in side portions of bags.

BACKGROUND ART

In recent years, as machines that perform bag making and packaging by making bags and filling the insides of those bags with contents such as snack foods, there have been bag making and packaging machines. For example, in vertical bag making and packaging machines called form-fill-seal machines, a packaging material that is a sheet-like film is formed into a tubular shape by a former and a tube, and the overlapping vertical edges of the tubular packaging material are heat-sealed (heat-welded) to form a tubular packaging material by a vertical sealing mechanism. Then, the inside of the tubular packaging material that eventually becomes made into bags is filled with contents from the tube, heat sealing is performed across the upper end portion of one bag and the lower end portion of the trailing bag by a transverse sealing mechanism below the tube, and thereafter the center of that heat-sealed portion (transverse seal portion) is cut by cutters.

Further, among such bag making and packaging machines, there are machines that perform bag making processing while forming gussets (fold portions) in positions that become the side portions of the bags.

For example, in Japanese Laid-Open Patent Application Publication No. 7-156908 published on Jun. 20, 1995, there is disclosed a vertical form-fill-seal machine that forms gussets in side portions of bags by using air cylinders to drive a left-and-right pair of gusset plates into and out of a packaging material that is intermittently conveyed.

SUMMARY

However, the conventional bag making and packaging machine above has the problem described below.

That is, there is the fear that, when the bag making and packaging machine disclosed in the publication above is configured to form gussets while continuously conveying the packaging material, creases or the like will form in the packaging material being conveyed and excellent sealing performance will become unable to be ensured when the gusset plates touch the packaging material in a state where the gusset plates are stopped with respect to the conveyance direction of the packaging material.

It is a problem of the present invention to provide a bag making and packaging machine which, even when a gusset forming mechanism is installed in a bag making and packaging machine that continuously conveys a packaging material, can avoid a situation where the sealing performance of transverse seal portions or the like ends up deteriorating while the machine efficiently performs bag making processing.

A bag making and packaging machine pertaining to a first aspect of the present invention is equipped with a conveying unit, a transverse sealing mechanism, and a gusset forming mechanism. The conveying unit continuously conveys a tubular packaging material. The transverse sealing mechanism has a pair of sealing jaws that revolvingly move while following annular loci and to seal the tubular packaging material in a transverse direction with respect to a conveyance direction of the tubular packaging material. The gusset forming mechanism has a pair of folding members that are pressed against side portions of the tubular packaging material to form gussets in the side portions of the tubular packaging material while moving along the conveyance direction of the tubular packaging material before the transverse sealing mechanism seals the tubular packaging material.

Here, in the bag making and packaging machine that performs bag making processing while continuously conveying the packaging material that is to be made into bags, when the folding members that create the gussets (fold portions) in the side portions of the bags are pressed against positions in the packaging material corresponding to the side portions of the bags, the folding members are driven so as to be caused to move along the conveyance direction of the packaging material.

Here, the gusset forming mechanism is placed in the neighborhood of the transverse sealing mechanism, and the gusset forming mechanism has the folding members that are inserted from the left and right sides of the tubular packaging material immediately before transverse sealing is performed and form the fold portions in the positions that become the side portions of the bags. Additionally, when the folding members are pressed against the packaging material that is continuously conveyed, the folding members form the gussets while moving at a speed that is substantially equal to the conveyance speed of the packaging material, for example, along the conveyance direction of the packaging material.

Thus, even when the bag making and packaging machine forms the gussets while continuously conveying the packaging material, the folding members are pressed against parts of the packaging material that is continuously conveyed, and a situation where creases or the like form can be avoided. Thus, even when a gusset forming mechanism is installed in a bag making and packaging machine that uses a packaging material that is continuously conveyed, excellent sealing performance can be ensured while the machine efficiently performs bag making processing.

A bag making and packaging machine pertaining to a second aspect of the present invention is the bag making and packaging machine pertaining to the first aspect of the present invention, wherein the gusset forming mechanism preferably annularly moves each of the folding members.

Here, the pair of folding members included in the gusset mechanism each are caused to move along annular trajectories so as to sandwich the packaging material.

Here, causing the folding members to move annularly includes causing the folding members to move in the conveyance direction of the packaging material along substantially circular or substantially quadrangular trajectories, for example.

Thus, even when the folding members have been pressed against the packaging material that is continuously conveyed, the folding members can be caused to move in the same direction as the packaging material along annular trajectories.

As a result, excellent sealing can be performed without causing creases or the like to form in parts of the packaging material.

A bag making and packaging machine pertaining to a third aspect of the present invention is the bag making and packaging machine pertaining to the first or second aspect of the present invention, wherein the gusset forming mechanism preferably moves the folding members along circular trajectories.

Here, the pair of folding members that are pressed against the packaging material that is continuously conveyed are set so as to move along circular trajectories in the same conveyance direction as the packaging material at the positions where the folding members are pressed against the packaging material.

Thus, the folding members that have been pressed against the packaging material can easily be caused to move along the same conveyance direction as the packaging material. As a result, excellent sealing can be performed without causing creases or the like to form in parts of the packaging material.

A bag making and packaging machine pertaining to a fourth aspect of the present invention is the bag making and packaging machine pertaining to any one of the first to third aspects of the present invention, wherein when the folding members are contacting the tubular packaging material, the gusset forming mechanism preferably moves the folding members at a speed that is substantially equal to or slightly faster than a conveyance speed of the tubular packaging material.

Here, when the pair of folding members that form the gussets in the side portions of the bags are pressed against the packaging material, the folding members are caused to move along the conveyance direction of the packaging material at a speed that is substantially the same as or slightly faster than the conveyance speed of the packaging material.

Thus, when the folding members have been pressed against the packaging material, tension that acts on the packaging material can be kept to a minimum in the neighborhoods of the portions contacted by the folding members. Thus, a situation where creases or the like end up forming in parts of the packaging material on the upstream sides of the portions touched by the folding members can be avoided, and a balance between increasing the efficiency of bag making processing resulting from continuous conveyance of the packaging material and excellent sealing performance can be realized.

A bag making and packaging machine pertaining to a fifth aspect of the present invention is the bag making and packaging machine pertaining to any one of the first to fourth aspects of the present invention, wherein the gusset forming mechanism preferably further has a servo motor that drives the folding members, and the gusset forming mechanism preferably varies an angular velocity of the servo motor between when the folding members are contacting the tubular packaging material and when the folding members are not contacting the packaging material.

Here, a servo motor is installed in the gusset forming mechanism as a drive source that drives the pair of folding members. Additionally, for example, when the folding members that move along substantially circular trajectories are pressed against the packaging material, the angular velocity of the servo motor is set to match the conveyance speed of the packaging material. On the other hand, on the trajectories excluding the positions where the folding members contact the packaging material, for example, the angular velocity of the servo motor is set such that the folding members move at a higher speed than during the time when they are contacting the packaging material.

Thus, for example, the folding members can be caused to move at an arbitrary speed by the servo motor depending on the positions of the folding members on their circular trajectories. As a result, for example, even when the folding members are caused to move along circular trajectories using the servo motor as the drive source, the folding members can be caused to move at substantially the same speed as the conveyance speed of the packaging material, or can be caused to move at a higher speed to increase efficiency, by adjusting the set value of the angular velocity of the servo motor.

A bag making and packaging machine pertaining to a sixth aspect of the present invention is the bag making and packaging machine pertaining to any one of the first to fifth aspects of the present invention, wherein the gusset forming mechanism preferably moves the folding members away from the tubular packaging material when the sealing jaws seal the tubular packaging material in the transverse sealing mechanism.

Here, the folding members that form the gussets in the positions corresponding to the side portions of the bags are caused to move away from the packaging material immediately before transverse sealing processing is performed by the transverse sealing mechanism.

Thus, the folding members that have been pressed against the packaging material from both sides of the packaging material in order to form the gussets do not get in the way of the transverse sealing processing. Thus, excellent sealing performance can be ensured while the gussets are formed in the side portions of the bags.

A bag making and packaging machine pertaining to a seventh aspect of the present invention is the bag making and packaging machine pertaining to any one of the first to sixth aspects of the present invention, wherein the folding members preferably include thin plate-shaped members. Here, thin-walled plate-like members are used as the folding members. Thus, the gussets can easily be formed in the side portions of the bags by causing the pair of folding members to move so as to be inserted from the sides of the tubular packaging material.

A bag making and packaging machine pertaining to an eighth aspect of the present invention is the bag making and packaging machine pertaining to the first aspect of the present invention, and further includes a control unit that control operations of the transverse sealing mechanism and the gusset forming mechanism. Moreover, the transverse sealing mechanism preferably further has shutter members. The shutter members touch the tubular packaging material before the sealing jaws touch the tubular packaging material to prevent entry of contents from above into a space inside a transverse sealing target portion of the tubular packaging material at which the tubular packaging material is sealed by the sealing jaws immediately after the shutter members touch the tubular packaging material. The control unit preferably controls the operation of the transverse sealing mechanism and the operation of the gusset forming mechanism so that the gussets are formed in the side portions of the tubular packaging material by the folding members before the shutter members reach a first state. The first state is a state where the shutter members prevent the entry of the contents from above into the space inside the transverse sealing target portion of the tubular packaging material.

Here, the bag making and packaging machine employs a configuration where the control unit controls the operation where the folding members of the gusset forming mechanism press against the packaging material and the operation where the shutter members and the sealing jaws of the transverse sealing mechanism touch the packaging material. Additionally, before the shutter members reach the first state where the shutter members exhibit their inherent function of preventing the entry of the contents from above into the space inside the transverse sealing target portion of the packaging material, control where the gussets are formed in both side portions of the packaging material by the folding members is performed by the control unit.

The inventors in the present application discovered that, when the speed of bag making ends of being given priority, the operation where the shutter members before the sealing processing touch the packaging material ends up temporally overlapping with the gusset forming operation resulting from the folding members, and there is the fear that the gussets will be not formed appropriately because of air turbulence inside the packaging material that arises when the shutter members are touching the packaging material. Thus, in order to avoid that situation, the inventors arrived at the present invention described above. That is, because of the control of the invention of the present application, the gussets are formed in both side portions of the packaging material before the shutter members reach the first state, so the gussets are cleanly formed.

A bag making and packaging machine pertaining to a ninth aspect of the present invention is the bag making and packaging machine pertaining to the eighth aspect of the present invention, wherein the transverse sealing mechanism preferably further has a pair of stripper members. The stripper members touch the tubular packaging material at substantially the same time as or after the shutter members touch the tubular packaging material and before the sealing jaws touch the tubular packaging material. Additionally, the stripper members move along the conveyance direction of the tubular packaging material at a faster speed than the packaging material before the sealing jaws seal the tubular packaging material. Further, the control unit, by its control, causes the state where the folding members that press against and have formed the gussets in the side portions of the tubular packaging material are contacting the tubular packaging material to be maintained at least until the stripper members reach a state where they sandwich the tubular packaging material in a state where the pair of stripper members are closest to each other.

Here, the bag making and packaging machine employs a configuration where the transverse sealing mechanism has the stripper members in addition to the sealing jaws and the shutter members, and the members touch the packaging material in the order of the shutter members, the stripper members, and the sealing jaws. Additionally, because of the control of the control unit, the folding members of the gusset forming mechanism that have already formed the gussets before the shutter members touch the packaging material maintain the state where they are contacting the packaging material at least until the pair of stripper members reach the state where they sandwich the packaging material in the state where the pair of stripper members are closest to each other. For this reason, situations where the gussets that have been formed end up losing their shape because of air turbulence inside the packaging material that arises because of the stripper members touching the packaging material virtually disappear. Thus, the gussets are formed more cleanly.

A bag making and packaging machine pertaining to a tenth aspect of the present invention is the bag making and packaging machine pertaining to the ninth aspect of the present invention, wherein in at least a part of one of the stripper members is preferably recessed away from the other one of the stripper members at a portion (hereinafter called a stripper central portion) corresponding to a central portion between the side portions of the tubular packaging material than portions (hereinafter called stripper side portions) that press against the side portions and the vicinity thereof of the tubular packaging material in which the gussets are formed.

Before the sealing processing, the pair of stripper members move along the conveyance direction of the packaging material at a faster speed than the packaging material in a state where the stripper members sandwich the packaging material. Thus, the contents in the space inside the transverse sealing target portion are driven into the space further below, and a phenomenon where the contents bite into the transverse seal is suppressed.

When the pair of stripper members perform this co-called stripping operation (ironing operation), a deaeration phenomenon occurs where the air inside the packaging material below the transverse sealing target portion escapes to the space inside the packaging material above the transverse sealing target portion. In this deaeration phenomenon, the air escapes from below to above through the slight clearance inside the packaging material sandwiched between and held by the pair of stripper members. In ordinary bag making and packaging machines, oftentimes the air escaping in this deaeration phenomenon travels through both side portions of the packaging material. That is, the clearance between the pair of stripper members is made small in the place (the stripper central portion) corresponding to the central portion of the packaging material and is made large in the places (the stripper side portions) corresponding to both side portions of the packaging material.

However, in the present invention, the gussets are formed in both side portions of the packaging material, and the tubular packaging material in which those gussets have been formed is transversely sealed, so when conventional stripper members are employed as is, there is the fear that the gussets that have been formed will end up collapsing because of the deaeration phenomenon in the stripping operation.

In view of this, in the bag making and packaging machine pertaining to the tenth aspect of the present invention, at least one of the pair of stripper members employs a shape where the stripper central portion is recessed away from the other stripper member more than the stripper side portions. Thus, the clearance in the packaging material sandwiched between the pair of stripper members becomes larger in the central portion than in both side portions, and the air below travels through the central portion inside the packaging material and escapes above in the stripping operation. For this reason, situations where the gussets that have been formed in both side portions of the packaging material lose their shape because of the deaeration phenomenon virtually disappear. Further, until the pair of stripper members reach the state where they sandwich the packaging material in the state where the pair of stripper members are closest to each other, the folding members maintain the state where they are contacting the packaging material as mentioned in the description of the ninth aspect of the present invention, so the gussets maintain their clean shape. As a result, in the bag making and packaging machine pertaining to the tenth aspect of the present invention, the gussets are formed more cleanly.

After the stripper members sandwich the packaging material, it becomes unnecessary for the folding members to maintain the state where they are contacting the packaging material, so it is preferable to cause the folding members to speedily move away from the packaging material. Thus, the folding members can quickly take action to prepare for subsequent gusset formation.

A bag making and packaging machine pertaining to an eleventh aspect of the present invention is the bag making and packaging machine pertaining to any of the eighth to tenth aspects of the present invention, wherein the folding members preferably revolvingly move while following annular loci separate from those of the sealing jaws. Additionally, the control unit preferably sets revolving speeds of the folding members after the shutter members have reached the first state to zero or a value smaller than the revolving speed of the folding members when the folding members are forming the gussets in the side portions of the tubular packaging material.

Here, in regard to the folding members that have already formed the gussets when the shutter members have reached the first state, the revolving speed of those folding members after the shutter members have reached the first state temporarily becomes zero or slower than their revolving speed during gusset formation. Thus, in addition to the effect of the eighth aspect of the present invention that gusset formation is not inhibited by air turbulence inside the packaging material when the shutter members reach the first state, the occurrence of the problem where the gussets that have been formed end up collapsing because of air turbulence inside the packaging material that arises because of the operation of the transverse sealing mechanism after the shutter members have reached the first state can be suppressed. This is because the folding members maintain the state where they are contacting the packaging material because the revolving speed of the folding members that have formed the gussets becomes smaller or zero.

Thus, problems such as gusset formation being inhibited or the gussets losing their shape after formation due to the series of operations of the transverse sealing mechanism are suppressed, and the gussets are cleanly formed in the bags after transverse sealing.

A bag making and packaging machine pertaining to a twelfth aspect of the present invention is the bag making and packaging machine pertaining to any of the eighth to eleventh aspects of the present invention, wherein lower ends of the folding members are preferably positioned lower than the shutter members when the shutter members have reached the first state.

Here, in the first state, the lower ends of the folding members are positioned lower than the shutter members that sandwich the packaging material, so the gussets are cleanly formed.

A bag making and packaging machine pertaining to a thirteenth aspect of the present invention is the bag making and packaging machine pertaining to the twelfth aspect of the present invention, wherein the lower ends of the folding members and the sealing jaws preferably become as close to each other as 10 mm or less when the shutter members have reached the first state.

Here, the bag making and packaging machine employs a configuration where the folding members become close to the immediate tops of the sealing jaws, so even when an airflow flowing from below to above inside the packaging material arises in the transverse sealing operation, the problem of the gussets spreading open (collapsing) virtually no longer occurs, and the gussets are cleanly formed.

A bag making and packaging machine pertaining to a fourteenth aspect of the present invention is the bag making and packaging machine pertaining to the twelfth or thirteenth aspect of the present invention, the shutter members preferably have a pair of body portions that are rigid bodies and a pair of auxiliary portions that are elastic bodies. Additionally, in the first state, the pair of body portions sandwich the tubular packaging material including both side portions of the tubular packaging material that the folding members are preferably touching in a state where there is a clearance between the body portions that is larger than the thickness dimension of the folding members. Further, in the first state, the auxiliary portions preferably sandwich the tubular packaging material so as to press against the folding members.

In the twelfth and thirteenth aspects of the present invention, in the first state, the lower ends of the folding members become positioned lower than the shutter members, so the shutter members sandwich the packaging material and the folding members. In view of this, in the bag making and packaging machine of the fourteenth aspect of the present invention, the pair of body portions that are rigid bodies that would end up inhibiting the conveyance of the packaging material if they ended up pressing against the folding members from over the packaging material are caused to sandwich the packaging material such that a clearance is formed between them and the folding members, and the pair of auxiliary portions that are elastic bodies are pressed against the folding members such that the contents do not enter through that clearance. Thus, the inherent function of the shutter members is maintained while resistance of the shutter members with respect to the conveyance of the packaging material is kept small.

A bag making and packaging machine pertaining to a fifteenth aspect of the present invention is the bag making and packaging machine pertaining to the eighth aspect of the present invention, wherein the control unit preferably lowers the conveyance speed of the packaging material via the conveying unit around a point in time when the folding members contact the tubular packaging material.

When the operating speed of the folding members along the conveyance direction of the packaging material is slower than the conveyance speed of the packaging material when the folding members contact the packaging material, the contact between the folding members and the packaging material becomes resistance in the conveyance direction for the packaging material, and the packaging material loses its shape. However, in this bag making and packaging machine, by lowering the conveyance speed of the packaging material, the operating speed of the folding members along the conveyance direction of the packaging material and the conveyance speed of the packaging material become closer to each other, so resistance becomes smaller and shape loss of the packaging material is suppressed.

A bag making and packaging machine pertaining to a sixteenth aspect of the present invention is the bag making and packaging machine pertaining to the fifteenth aspect of the present invention, wherein the transverse sealing mechanism preferably further has a pair of stripper members. The stripper members touch the tubular packaging material at substantially the same time as or after the shutter members touch the tubular packaging material and before the sealing jaws touch the tubular packaging material, and to move along the conveyance direction of the tubular packaging material at a faster speed than a conveyance speed of the tubular packaging material before the sealing jaws seal the tubular packaging material.

In this bag making and packaging machine, the pair of stripper members sandwich the packaging material and move along the conveyance direction of the packaging material at a faster speed than the packaging material, so the packaging material becomes pulled in the conveyance direction, and it becomes difficult for creases to form in the packaging material.

A bag making and packaging machine pertaining to a seventeenth aspect of the present invention is the bag making and packaging machine pertaining to the sixteenth aspect of the present invention, wherein when the sealing jaws seal the tubular packaging material, the control unit preferably sets a speed of the sealing jaws along the conveyance direction of the tubular packaging material slower than the conveyance speed of the tubular packaging material.

In this bag making and packaging machine, the speed of the sealing jaws along the conveyance direction of the packaging material becomes slower than the conveyance speed of the packaging material, so the area above the sealing-processed portion of the packaging material approaches the sealing jaws, is heated, and changes to an easily welded state. At the stage where the packaging material becomes made into the bags and those bags are sequentially discharged, the surface that has changed to that easily welded state and one surface of the portion that has been sealing-processed firmly stick to each other such that a planar region is formed. As a result, the bags stand upright at those planar regions.

A bag making and packaging machine pertaining to an eighteenth aspect of the present invention is the bag making and packaging machine pertaining to the first aspect of the present invention, wherein the folding members preferably have first surfaces, second surfaces, and air blowout ports. The first surfaces press against the side portions of the tubular packaging material. The second surfaces are adjacent to the first surfaces and diagonally oppose the tubular packaging material immediately before the sealing jaws start sealing the tubular packaging material. The air blowout ports are formed in the first surfaces and in the second surfaces. Air is blown out from the air blowout ports when the folding members form the gussets in the side portions of the tubular packaging material.

In this bag making and packaging machine, before the tubular packaging material is sealing-processed by the sealing jaws, the side portions of the tubular packaging material are subjected to pressure by the air that has been blown out from the air blowout ports in the second surfaces, so the gussets do not open outward, and clean folds are formed.

A bag making and packaging machine pertaining to a nineteenth aspect of the present invention is the bag making and packaging machine pertaining to the first aspect of the present invention, wherein the folding members preferably have first surfaces, second surfaces, and heaters. The first surfaces press against the side portions of the tubular packaging material. The second surfaces are adjacent to the first surfaces and diagonally oppose the tubular packaging material immediately before the sealing jaws start sealing the tubular packaging material. The heaters are fixed onto surfaces on opposite sides of the first surfaces and heat the folding members.

In this bag making and packaging machine, the high-temperature first surfaces and second surfaces heat and soften the side portions of the tubular packaging material when the folding members fold the side portions of the tubular packaging material, so it becomes easier for the side portions of the packaging material to follow the operation of the folding members, and clean folds are formed.

A bag making and packaging machine pertaining to a twentieth aspect of the present invention is the bag making and packaging machine pertaining to the first aspect of the present invention, wherein the folding members preferably have first surfaces, second surfaces, air blowout ports, and heaters. The first surfaces press against the side portions of the tubular packaging material. The second surfaces are adjacent to the first surfaces and diagonally oppose the tubular packaging material immediately before the sealing jaws start sealing the tubular packaging material. The air blowout ports are formed in the first surfaces and in the second surfaces. The heaters are fixed onto surfaces on opposite sides of the first surfaces and heat the folding members. Air is blown out from the air blowout ports when the folding members form the gussets in the side portions of the tubular packaging material.

In this bag making and packaging machine, the high-temperature first surfaces and second surfaces heat and soften the side portions of the tubular packaging material when the folding members fold the side portions of the tubular packaging material, so it becomes easier for the side portions of the packaging material to follow the operation of the folding members. Moreover, before the side portions of the tubular packaging material is sealing-processed by the sealing jaws, the side portions of the tubular packaging material are subjected to pressure by the high-temperature air that has been blown out from the air blowout ports in the second surfaces, so the gussets do not open outward, and clean folds are formed.

According to the bag making and packaging machine of the present invention, even when a gusset forming mechanism is installed in a bag making and packaging machine that continuously conveys a packaging material and makes a bag, a situation where the sealing performance of transverse seal portions or the like ends up deteriorating can be avoided while the machine efficiently performs bag making processing.

BRIEF DESCRIPTION OF THE DRAWINGS

FIG. 1 is a perspective view showing the overall configuration of a combinatorial weighing system pertaining to a first embodiment of the present invention.

FIG. 2 is a perspective view showing the configuration of a bag making and packaging machine included in the combinatorial weighing system of FIG. 1.

FIG. 6 is a schematic view showing movement along substantially circular trajectories of the folding members included in the gusset forming mechanism of FIG. 4.

FIG. 8 is an exploded perspective view generally showing the configuration of each member included in the bag making and packaging machine of FIG. 7.

FIG. 9 is a plan view showing the state where the folding members have been pressed against the tubular film.

DESCRIPTION OF EMBODIMENTS

First Embodiment

Figure 3:
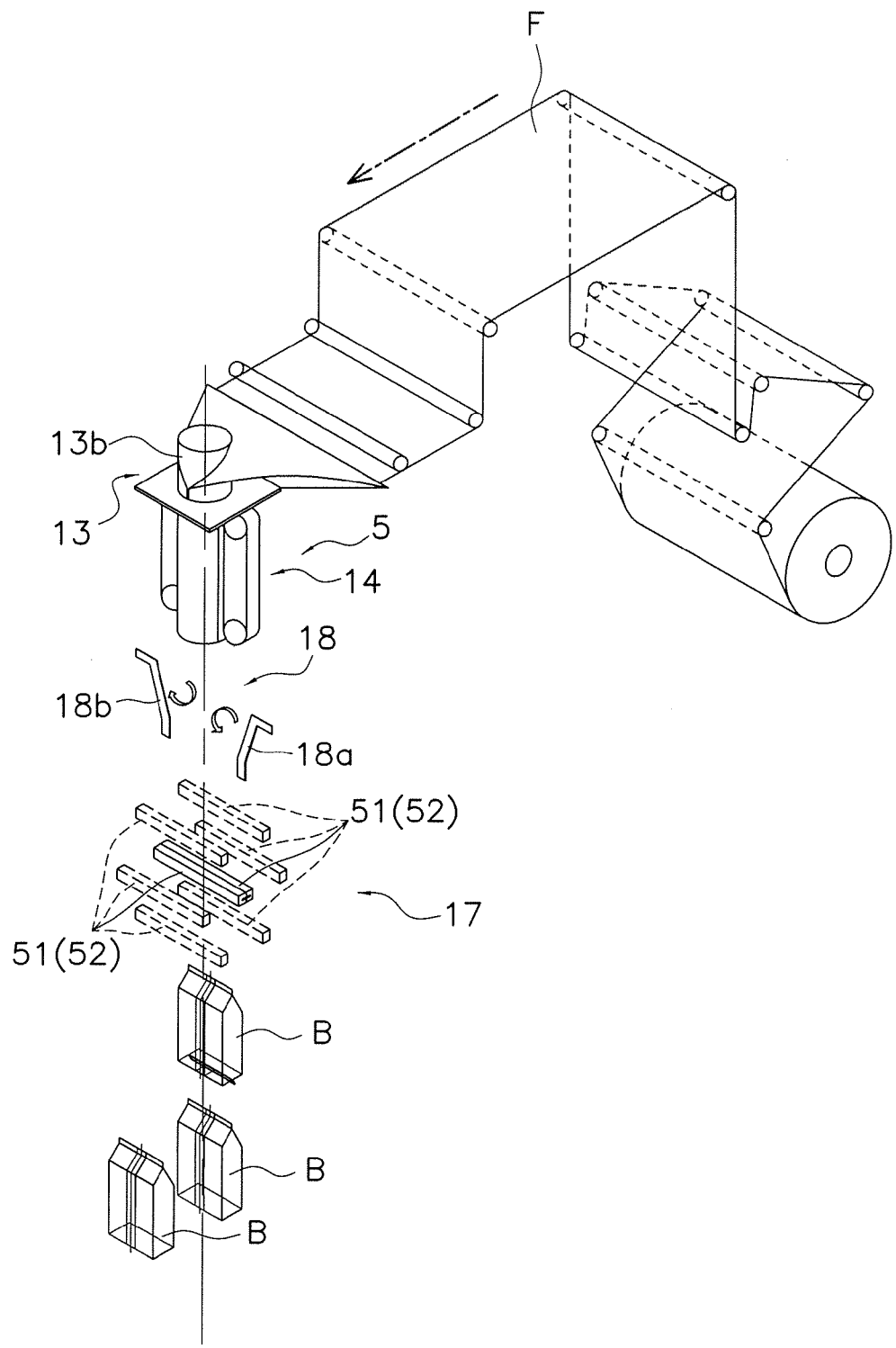
FIG. 3 is an exploded perspective view generally showing the configuration of each member included in the bag making and packaging machine of FIG. 2.

A combinatorial weighing system 10 equipped with a bag making and packaging machine 3 pertaining to a first embodiment of the present invention will be described below using FIG. 1 to FIG. 6.

The expressions "upstream side" and "downstream side" used in the description below mean directions based on the direction in which a film F is conveyed.

Overall Configuration of Combinatorial Weighing System 10

As shown in FIG. 1, the combinatorial weighing system 10 pertaining to the present embodiment is a system that weighs a product C (see FIG. 2) such as potato chips that becomes contents, covers the weighed product C with a film, and vertically and transversely seals the film that has become tubular to thereby bag the product C. The combinatorial weighing system 10 is mainly equipped with a combinatorial weighing machine 2 and the bag making and packaging machine 3.

The product C is weighed per predetermined weight in the combinatorial weighing machine 2 disposed above the bag making and packaging machine 3, is stored inside hoppers, and is discharged so as to become a predetermined total weight by frequency weighing.

As shown in FIG. 1, the combinatorial weighing machine 2 is placed above the bag making and packaging machine 3 described later and performs frequency weighing, where it weighs the product C per predetermined weight in weighing hoppers, thereafter combines these weighed values into the predetermined total weight, and sequentially discharges the product C to obtain the product C of the predetermined total weight.

The bag making and packaging machine 3 is a machine that uses the film F that is continuously conveyed to bag the product C that has been discharged in an amount corresponding to the predetermined total weight as a result of the frequency weighing in the combinatorial weighing machine 2. This bag making and packaging machine 3 will be described in detail later.

Bag Making and Packaging Machine 3

As shown in FIG. 1, the bag making and packaging machine 3 is configured to include a bag making and packaging unit 5 and a film supplying unit 6 that supplies the film F that becomes made into bags to this bag making and packaging unit 5.

The film supplying unit 6 is a unit that supplies the sheet-like film F to a forming mechanism 13 (see FIG. 2) of the bag making and packaging unit 5, and the film supplying unit 6 is disposed adjacent to the bag making and packaging unit 5.

As shown in FIG. 2, the bag making and packaging unit 5 has the forming mechanism 13 that forms the sheet-like film F sent thereto into a tubular shape, a pull-down belt mechanism 14 that continuously conveys the film F that has become tubular (hereafter called "tubular film Fm"), a vertical sealing mechanism 15 that vertically seals an overlapping portion of the tubular film Fm, a transverse sealing mechanism 17 that seals upper and lower end portions of bags B by transversely sealing the tubular film Fm, and a gusset forming mechanism 18.

The forming mechanism 13 has a tube 13b and a former 13a. The tube 13b is a member with a cylindrical shape, and its upper and lower ends are open. The contents C that have been weighed by the combinatorial weighing machine 2 are dropped into the open portion of the upper end of this tube 13b. The former 13a is placed so as to surround the tube 13b. The shape of this former 13a is a shape by which the sheet-like film F that has been unreeled from a film roll is formed into a tubular shape when the film F passes between the former 13a and the tube 13b (see FIG. 2). Further, the tube 13b and the former 13a of the forming mechanism 13 can be replaced depending on the size of the bags that are to be made.

As shown in FIG. 2, the pull-down belt mechanism 14 is a mechanism that sucks and continuously conveys downward the tubular film Fm wrapped around the tube 13b. Belts 14c are disposed on both left and right sides of the pull-down belt mechanism 14 so as to sandwich the tube 13b. In the pull-down belt mechanism 14, the belts 14c, which have a sucking function, are rotated by drive rollers 14a and driven rollers 14b and carry the tubular film Fm downward. In FIG. 2, illustration of a roller drive motor that causes the drive rollers 14a and the like to rotate is omitted.

The vertical sealing mechanism 15 is a mechanism that heats the overlapping portion of the tubular film Fm wrapped around the tube 13b while pressing the overlapping portion with a constant pressure against the tube 13b to thereby vertically seal the overlapping portion. This vertical sealing mechanism 15 is positioned on the front surface side of the tube 13b and has a heater and a heater belt that is heated by the heater and contacts the overlapping portion of the tubular film Fm. Further, although it is not shown in the drawings, the vertical sealing mechanism 15 is also equipped with a drive device for driving the heater belt toward and away from the tube 13b.

The transverse sealing mechanism 17 is placed below the forming mechanism 13, the pull-down belt mechanism 14, and the vertical sealing mechanism 15. As shown in FIG. 2, the transverse sealing mechanism 17 is configured to include a pair of sealing jaws 51 and 52 that have built-in heaters.

The pair of sealing jaws 51 and 52 press against each other, so as to sandwich and hold the tubular film Fm, and apply pressure and heat to, and thereby seal, parts of the tubular film Fm that become upper and lower end portions of the bags.

As shown in FIG. 3, the gusset forming mechanism 18 is placed between the pull-down belt mechanism 14 and the transverse sealing mechanism 17 and uses a pair of folding members 18a and 18b, which are placed on the left and right so as to sandwich the tubular film Fm, to form gussets (fold portions) G (see FIG. 5A and the like) in side surface portions of the bags B. This gusset forming mechanism 18 will be described in detail later.

Configuration of Transverse Sealing Mechanism 17

As shown in FIG. 2, the transverse sealing mechanism 17 is placed below the forming mechanism 13, the pull-down belt mechanism 14, and the vertical sealing mechanism 15. This transverse sealing mechanism 17 causes the two sealing jaws 51 and 52 to revolve in D-like shapes and, when transversely sealing the tubular film Fm, presses the pair of sealing jaws 51 and 52 against each other to thereby form a transverse seal portion.

Configuration of Gusset Forming Mechanism 18

Figure 4:
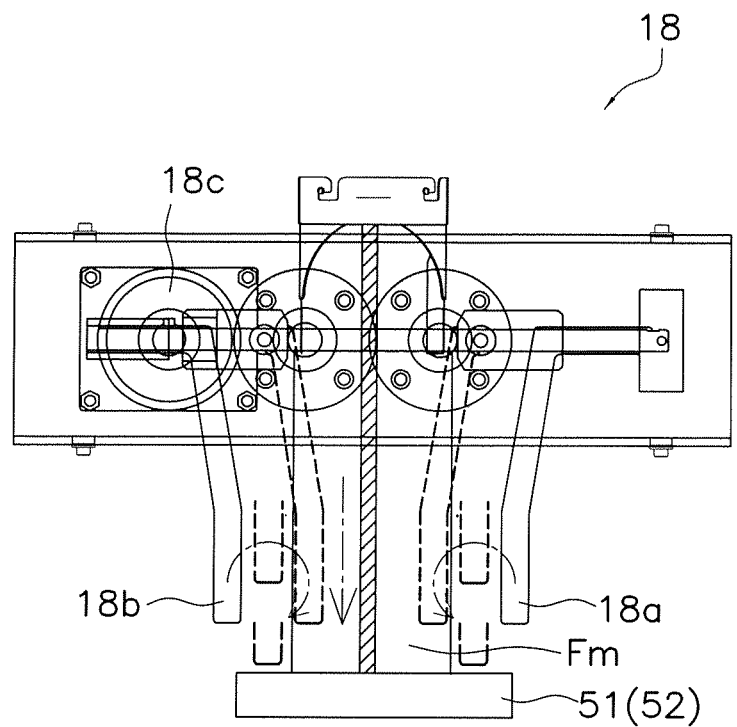
FIG. 4 is a front view showing the configuration of the vicinity of a gusset forming mechanism and a transverse sealing mechanism included in the bag making and packaging machine of FIG. 2.
Figure 4:
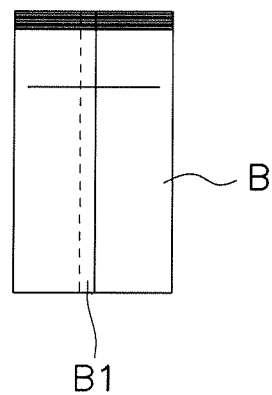

As shown in FIG. 3 and FIG. 4, the gusset forming mechanism 18 is equipped with the folding members 18a and 18b and a motor 18c. In the first embodiment, the motor 18c is a servo motor.

Figure 5A:
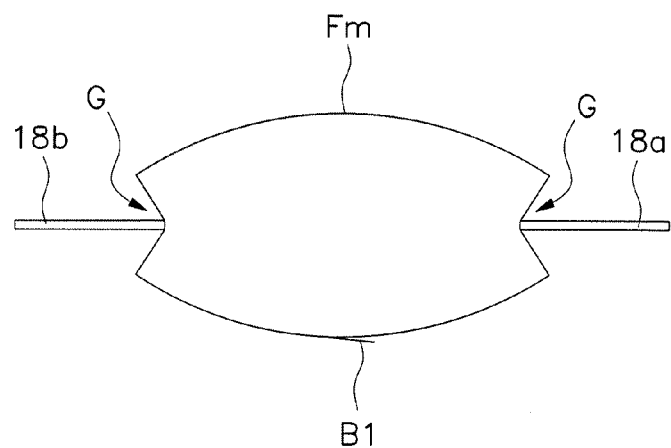
FIG. 5A is a plan view showing a state where folding members have been pressed against a tubular film.
Figure 5B:
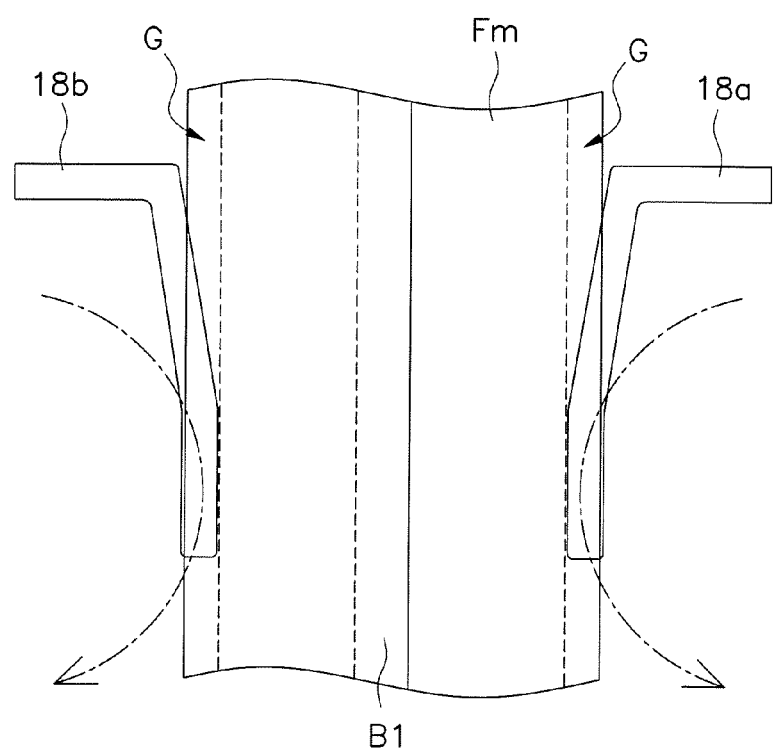
FIG. 5B is a front view showing the state where the folding members have been pressed against the tubular film.

As shown in FIG. 2 and FIG. 3, the folding members 18a and 18b are thin-walled plate-like members. As shown in FIG. 4 and FIG. 5B, the folding members 18a and 18b touch parts of the tubular film Fm so as to sandwich side surfaces to the left and right of a vertical seal portion B1 of the tubular film Fm while moving along substantially circular trajectories. At this time, as shown in FIG. 5A and FIG. 5B, inwardly folded portions (the gussets G) are formed in parts of the tubular film Fm. Further, as shown in FIG. 6, in the moving regions where the folding members 18a and 18b contact the tubular film F, the folding members 18a and 18b move at a lower speed than in the other regions to match the conveyance speed of the tubular film Fm. In other words, the folding members 18a and 18b are driven by the motor 18c such that the trajectories on which the folding members 18a and 18b move along substantially circular trajectories include low speed regions and high speed regions.

Here, the moving speed of the folding members 18a and 18b in the low speed regions is set so as to become a speed that is substantially the same as or slightly faster than the conveyance speed of the tubular film Fm conveyed toward the downstream side by the pull-down belt mechanism 14. Thus, even in the state where the folding members 18a and 18b and the tubular film Fm touch each other, the folding members 18a and 18b move at substantially the same speed together with the tubular film Fm, so a situation where creases or the like end up forming in parts of the tubular film Fm conveyed by the pull-down belt mechanism 14 can be avoided. Thus, even in the bag making and packaging machine 3 that uses the folding members 18a and 18b to form the gussets G in the side surfaces of the bags B, the occurrence of defective seals caused by creases or the like in the tubular film Fm being conveyed can be prevented.

Further, the pair of folding members 18a and 18b move interlockingly with the movement of the sealing jaws 51 and 52 of the transverse sealing mechanism 17 placed on the immediate downstream side of the pair of folding members 18a and 18b. Specifically, immediately before the sealing jaws 51 and 52 press against each other and perform sealing processing while revolvingly moving in D-like shapes, the gusset forming mechanism 18 causes the folding members 18a and 18b to move from the state where they are contacting the tubular film Fm to retracted positions. Thus, a situation where the folding members 18a and 18b end up becoming sandwiched between the sealing jaws 51 and 52 during the transverse sealing processing can be avoided.

The motor 18c is installed in the gusset forming mechanism 18 as a drive source that drives the pair of folding members 18a and 18b described above. Additionally, as shown in FIG. 6, the motor 18c is controlled such that its angular velocity becomes smaller in the low speed regions where the folding members 18a and 18b contact the tubular film Fm than in the other high speed regions. Thus, the folding members 18a and 18b can be caused to move at a speed that is substantially comparable to the conveyance speed of the tubular film Fm in the low speed regions.

Characteristics of First Embodiment (1) The bag making and packaging machine 3 of the present embodiment is a machine equipped with the pull-down belt mechanism 14 that continuously conveys the tubular film Fm. As shown in FIG. 2 and FIG. 3, the bag making and packaging machine 3 is also equipped with the transverse sealing mechanism 17 that uses the pair of sealing jaws 51 and 52 to perform transverse sealing and the gusset forming mechanism 18 that forms the gussets G in the side surface portions of the bags B that are to be made. As shown in FIG. 4 and FIG. 5B, the gusset forming mechanism 18 has the pair of folding members 18a and 18b that move at substantially the same speed as the conveyance speed of the tubular film Fm in the regions where the folding members 18a and 18b contact the tubular film Fm, and the gusset forming mechanism 18 drives the folding members 18a and 18b so as to press them against parts of the tubular film Fm.

Thus, even when the folding members 18a and 18b have been pressed against parts of the tubular film Fm that is continuously conveyed, the gussets G can be formed in the side portions of the bags B without causing creases or the like to form in parts of the tubular film Fm. As a result, excellent sealing performance can be ensured even when the gussets G are formed in the tubular film Fm that is continuously conveyed.

(2) In the bag making and packaging machine 3 of the present embodiment, as shown in FIG. 6 and the like, the gusset forming mechanism 18 causes the pair of folding members 18a and 18b to move along annular (substantially circular) trajectories.

Thus, by setting the annular trajectories such that the folding members 18a and 18b move in the same direction as the conveyance direction of the tubular film Fm, the gussets G can be formed in the side surface portions of the bags B while causing the folding members 18a and 18b to move in the same direction as the tubular film Fm.

(3) In the bag making and packaging machine 3 of the present embodiment, as shown in FIG. 6 and the like, the gusset forming mechanism 18 causes the pair of folding members 18a and 18b to move along substantially circular trajectories.

Thus, using a rotational drive source such as the motor 18c, the folding members 18a and 18b can be driven along the conveyance direction of the tubular film Fm without the intervention of a complex mechanism or the like.

(4) In the bag making and packaging machine 3 of the present embodiment, as shown in FIG. 6 and the like, while the folding members 18*a* and 18*b* are contacting the tubular film Fm, the gusset forming mechanism 18 causes the pair of folding members 18*a* and 18*b* to move at substantially the same speed along the conveyance direction of the tubular film Fm.

Thus, even when the folding members 18*a* and 18*b* contact the tubular film Fm that is continuously conveyed, tension does not act on, and creases do not form in, parts of the tubular film Fm because of contact with the folding members 18*a* and 18*b*. Thus, the gussets G can be formed in the side surface portions of the bags B while the film F is continuously conveyed, and high-precision sealing processing can be performed.

(5) In the bag making and packaging machine 3 of the present embodiment, as shown in FIG. 4, the motor 18*c* is installed as the drive source that drives the pair of folding members 18*a* and 18*b* included in the gusset forming mechanism 18. Additionally, as shown in FIG. 6, while the folding members 18*a* and 18*b* are contacting the tubular film Fm, the motor 18*c* is controlled so as to rotate at an angular velocity that differs from the angular velocity in the other trajectory regions.

Thus, using the motor 18*c*, the moving speed on the trajectories of the folding members 18*a* and 18*b* can be varied by relatively simple control. Thus, for example, control by which the folding members 18*a* and 18*b* are caused to move at a low speed to match the conveyance speed of the tubular film Fm in the regions where the folding members 18*a* and 18*b* contact the tubular film Fm and by which the folding members 18*a* and 18*b* are caused to move at a high speed in the other regions can be easily performed.

(6) In the bag making and packaging machine 3 of the present embodiment, as shown in FIG. 4 and the like, when the transverse sealing processing is carried out by the sealing jaws 51 and 52 of the transverse sealing mechanism 17, the folding members 18*a* and 18*b* move so as to retract from the tubular film Fm.

Thus, even when the gusset forming mechanism 18 is placed on the immediate upstream side of the transverse sealing mechanism 17, a situation where, while the folding members 18*a* and 18*b* are used to form the gussets G immediately before the transverse sealing processing, the folding members 18*a* and 18*b* become sandwiched between the sealing jaws 51 and 52 performing the sealing processing such that there ends up being a defective seal can be avoided. Thus, the gussets G can be formed with good precision in the side surfaces of the bags B, and excellent transverse sealing processing can also be performed.

(7) In the bag making and packaging machine 3 of the present embodiment, as shown in FIG. 2, FIG. 3, and the like, thin-walled plate-like members are used as the pair of folding members 18*a* and 18*b* included in the gusset forming mechanism 18.

Thus, the gussets G can be formed easily by inserting parts of the plate-like portions of the folding members 18*a* and 18*b* into the side surface portions of the tubular film Fm so as to press those parts of the plate-like portions of the folding members 18*a* and 18*b* against the side surface portions of the tubular film Fm.

Modifications of First Embodiment

The first embodiment of the present invention has been described above, but the present invention is not limited to the embodiment described above and is capable of various changes in a scope that does not depart from the gist of the invention.

(A) In the first embodiment, an example has been described where the folding members 18*a* and 18*b* included in the gusset forming mechanism 18 are caused to move at a speed that is substantially comparable to the conveyance speed of the film F in the regions where the folding members 18*a* and 18*b* contact the tubular film Fm. However, the present invention is not limited to this.

For example, the folding members may also be controlled such that they are caused to move at a speed that is, for example, about 3% to 10% faster than the conveyance speed of the film.

Even in this case, the same effect as described above, which is that excellent sealing performance can be ensured without causing creases or the like to form in the portions of the tubular film Fm contacted by the folding members, can be obtained.

(B) In the first embodiment, an example has been described where the gussets are formed in the tubular film Fm while the folding members 18*a* and 18*b* included in the gusset forming mechanism 18 are caused to move along substantially circular trajectories. However, the present invention is not limited to this.

The shape of the trajectories on which the folding members move is not limited to being substantially circular and may also, for example, be a substantially quadrangular box shape, a substantially triangular shape, or a substantially elliptical shape.

(C) In the first embodiment, an example has been described where the pair of folding members 18*a* and 18*b* are driven by a single drive source (the motor 18*c*). However, the present invention is not limited to this.

For example, the bag making and packaging machine may also have a configuration where the pair of folding members 18*a* and 18*b* are caused to move using separate drive sources.

(D) In the first embodiment, an example has been described where the motor 18*c* (a servo motor) is used as the drive source that drives the pair of folding members 18*a* and 18*b*. However, the present invention is not limited to this.

For example, besides a servo motor, various actuators such as an air cylinder can be used as the drive source that drives the folding members.

Even in this case, the same effects as those described above can be obtained by causing the folding members to move along the conveyance direction of the film in the portions of the tubular film contacted by the folding members.

(E) In the first embodiment, an example has been described where substantially L-shaped thin-walled plate-like members are used as the folding members 18*a* and 18*b*. However, the present invention is not limited to this.

For example, the shape of the folding members is not limited to this, and besides thin-walled plate-like members, it is possible to use members having a certain extent of thickness or members having various shapes.

Second Embodiment

Among recent bag making and packaging machines, there are machines where shutter members are disposed in the transverse sealing mechanism. The shutter members are members that touch the packaging material before transverse sealing members having built-in heaters and prevent contents from entering from above into the space inside the packaging material that becomes the transverse seal portion. In bag making and packaging machines that have shutter members and perform continuous bag making, it is necessary to appropriately control the movement of gusset plates (folding members) in order to allow the gussets to be cleanly formed.

In a second embodiment, a combinatorial weighing system 10 equipped with a bag making and packaging machine where a transverse sealing mechanism including shutter members and a gusset forming mechanism are appropriately controlled such that the gussets are cleanly formed will be described using FIG. 7 to FIG. 19. The same reference signs and the same names will be given to members that are the same as those in the first embodiment, and detailed description of those same members will be omitted. Further, the expressions "upstream side" and "downstream side" mean directions based on the direction in which the film F is conveyed.

<Configuration of Bag Making and Packaging Machine 3>

Figure 7:
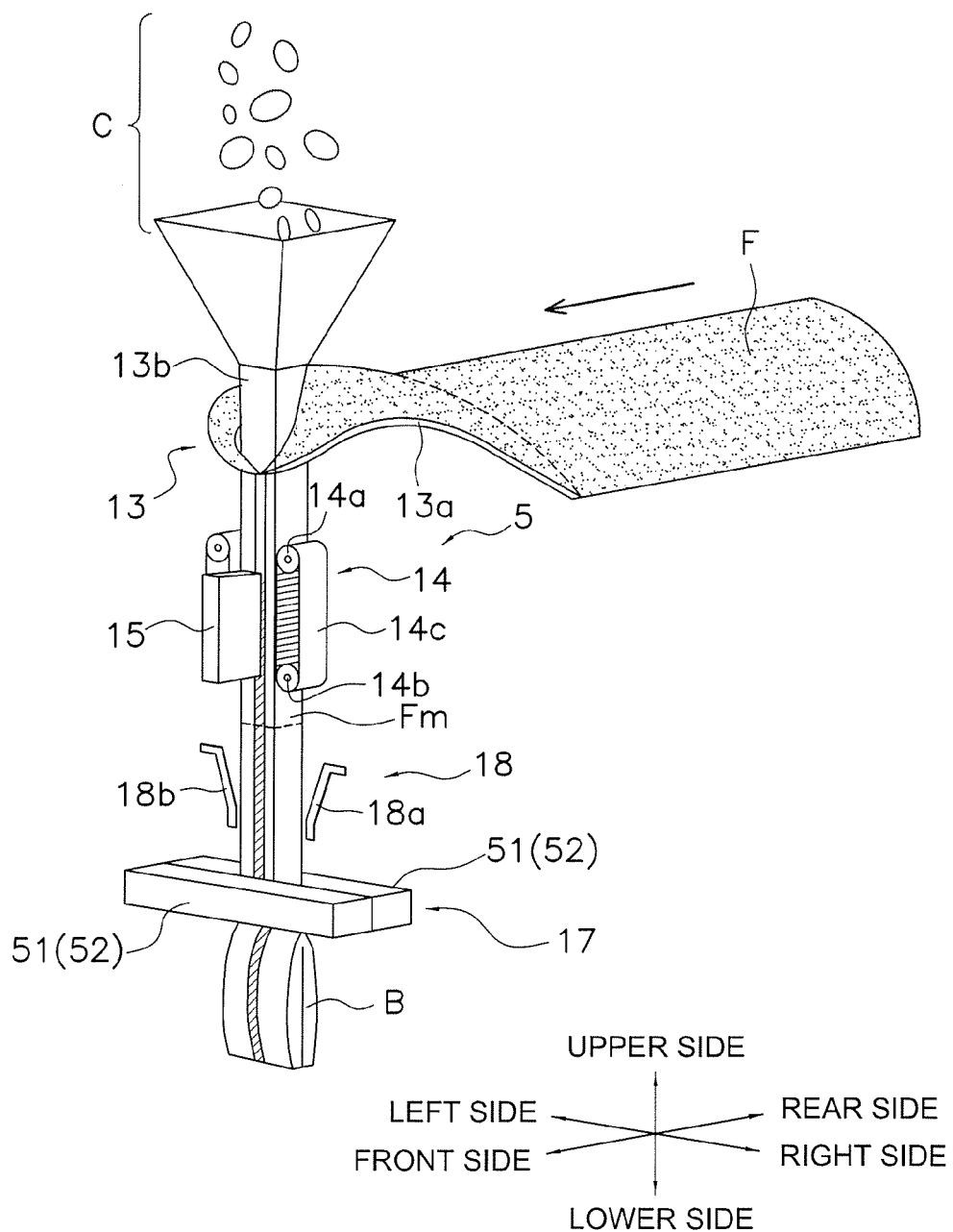
FIG. 7 is a perspective view showing the general configuration of a bag making and packaging machine pertaining to a second embodiment of the present invention.

The shape of the former 13a is a shape by which the sheet-like film F that has been unreeled from the film roll is formed into a square tube shape when the film F passes between the former 13a and the tube 13b (see FIG. 7). Consequently, the tube 13b of the forming mechanism 13 is a member with a square tube shape.

Four thin-plate members 13c extend downward from the four corners of the lower end of the tube 13b (see FIG. 8). These thin-plate members 13c are positioned planarly inside the four corners of the lower end of the tube 13b in height positions where the folding members 18a and 18b described later press against the square tube-shaped film Fm. Additionally, as shown in FIG. 9, these thin-plate members 13c support the square tube-shaped film Fm such that the four corner portions of both side portions of the square tube-shaped film Fm do not enter inward more than necessary in the gusset forming operation resulting from the folding members 18a and 18b.

As shown in FIG. 8, the gusset forming mechanism 18 is placed between the pull-down belt mechanism 14 and the transverse sealing mechanism 17 and uses the pair of folding members 18a and 18b, which are placed on the left and right so as to sandwich the square tube-shaped film Fm, to form the gussets (fold portions) G (See FIG. 9 and FIG. 5B) in the side surface portions of the square tube-shaped film Fm that becomes made into the bags B. This gusset forming mechanism 18 will be described in detail later.

The transverse sealing mechanism 17 is placed below the forming mechanism 13, the pull-down belt mechanism 14, the vertical sealing mechanism 15, and the gusset forming mechanism 18. This transverse sealing mechanism 17 will also be described in detail later.

A control unit 40 performs control of the combinatorial weighing machine 2 and control of the bag making and packaging machine 3 and is configured from a CPU, a ROM, a RAM, etc. The control unit 40 controls a feed motor 6a (see FIG. 18) that causes a film roller 6b to rotate in the film supplying unit 6 and unreel the film F and drive portions of each mechanism of the bag making and packaging unit 5 in accordance with operations and settings that have been inputted from operation switches 7 and a touch panel display 8 shown in FIG. 1 and FIG. 18. Further, the control unit 40 imports necessary information from various sensors installed in the combinatorial weighing machine 2 and in the bag making and packaging machine 3 and uses the information in various controls.

Detailed Configuration of Gusset Forming Mechanism 18

As shown in FIG. 8 and FIG. 4, the gusset forming mechanism 18 is equipped with the folding members 18a and 18b and the motor 18c. In the second embodiment, the motor 18c is a stepping motor.

As shown in FIG. 7 and FIG. 8, the folding members 18a and 18b are thin-walled plate-like members. Like in the first embodiment, as shown in FIG. 4 and FIG. 5B, the folding members 18a and 18b touch parts of the square tube-shaped film Fm so as to sandwich the side surfaces to the left and right of the vertical seal portion B1 of the square tube-shaped film Fm while moving along circular trajectories. At this time, as shown in FIG. 9 and FIG. 5B, inwardly folded portions (the gussets G) are formed in parts of the square tube-shaped film Fm. Further, the folding members 18a and 18b are driven by the motor 18c according to a command from the control unit 40 described later such that the folding members 18a and 18b go around along circular trajectories while changing their revolving speed.

Detailed Configuration of Transverse Sealing Mechanism 17

Figure 11:
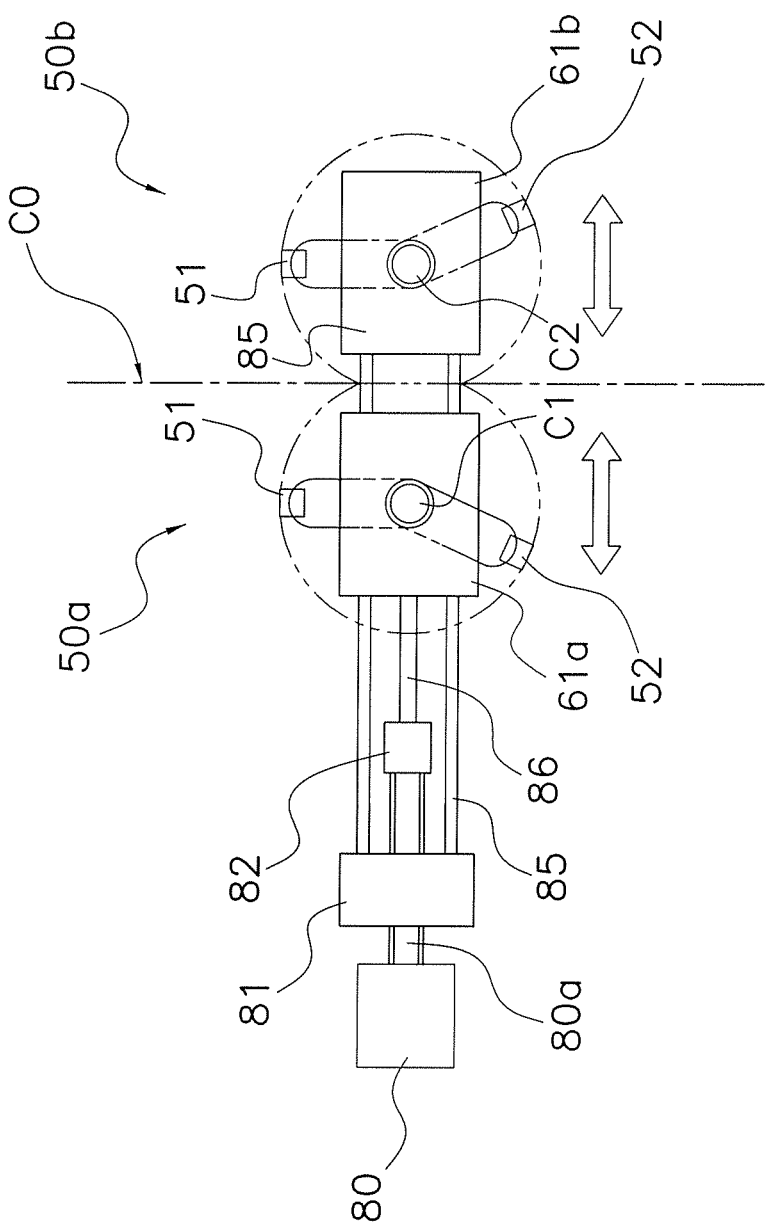
FIG. 11 is a side view of the transverse sealing mechanism.
Figure 12:
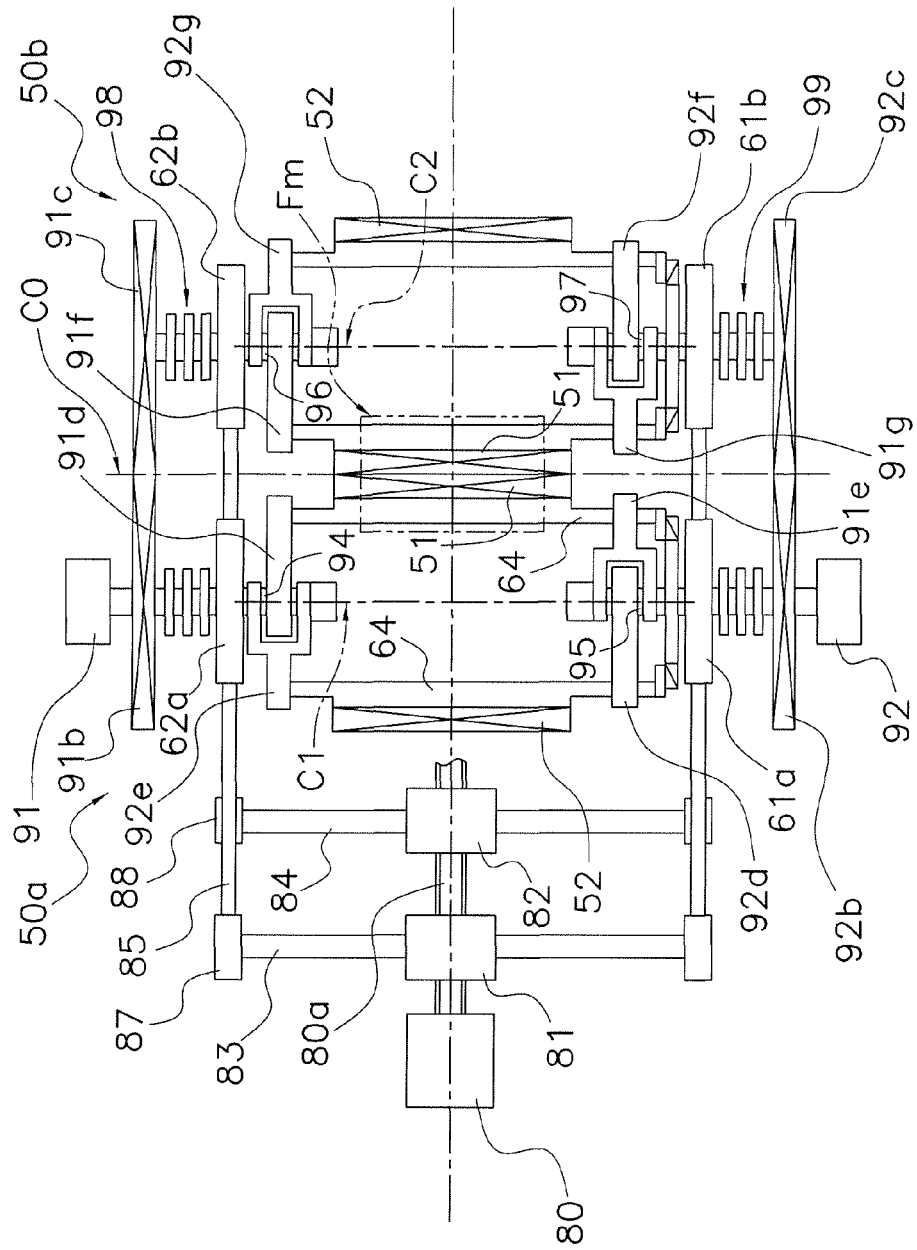
FIG. 12 is a plan view of the transverse sealing mechanism.

As shown in FIG. 11 and FIG. 12, the transverse sealing mechanism 17 is mainly configured from left and right sealing jaw moving units 50a and 50b. These sealing jaw moving units 50a and 50b are units for causing two pairs of sealing jaws 51 and 52 to revolve in D-like shapes (see the loci of the sealing jaws 51 and 52 indicated by the two-dotted chain lines in FIG. 11) and, when transversely sealing the square tube-shaped film Fm, causing the pair of sealing jaws 51 and 51 or the pair of sealing jaws 52 and 52 of both units 50a and 50b to press against each other. Below, the unit positioned on the left side of the square tube-shaped film Fm in FIG. 11 and FIG. 12 will be called a first sealing jaw moving unit 50a and the unit positioned on the right side of the square tube-shaped film Fm in FIG. 11 and FIG. 12 will be called a second sealing jaw moving unit 50b. The square tube-shaped film Fm is conveyed downward, along a plane C0 that demarcates both sealing jaw moving units 50a and 50b, in a state where the plane C0 becomes positioned in the width direction center of the square tube-shape film Fm.

The sealing jaw moving units 50a and 50b both have the sealing jaws 51 and 52, but the drive motor of the sealing jaws 51 and the drive motor of the sealing jaws 52 differ. The sealing jaws 51 are rotated about axes C1 and C2 by a drive motor 91. That is, the sealing jaw 51 of the first sealing jaw moving unit 50a rotates about the axis C1, and the sealing jaw 51 of the second sealing jaw moving unit 50b rotates about the axis C2. On the other hand, the sealing jaws 52 are rotated about the axes C1 and C2 by a drive motor 92. That is, the sealing jaw 52 of the first sealing jaw moving unit 50a rotates about the axis C1, and the sealing jaw 52 of the second sealing jaw moving unit 50b rotates about the axis C2.

Because of the rotation of the drive motor 91, gears 91b and 91c rotate, and the rotation is transmitted via Schmidt couplings 98 to revolving shafts 94 and 96 that are coaxial with the centers-of-revolution C1 and C2 of the sealing jaw moving units 50a and 50b. Additionally, one end of a lever 91d is fixed to the revolving shaft 94, and one end of a lever 91f is fixed to the revolving shaft 96, so the levers 91d and 91f rotate about the centers-of-revolution C1 and C2.

On the other hand, because of the rotation of the drive motor 92, gears 92b and 92c rotate, and the rotation is transmitted via Schmidt couplings 99 to revolving shafts 95 and 97 that are coaxial with the centers-of-revolution C1 and C2 of the sealing jaw moving units 50a and 50b. Additionally, one end of a lever 92d is fixed to the revolving shaft 95, and one end of a lever 92f is fixed to the revolving shaft 97, so the levers 92d and 92f rotate about the centers-of-revolution C1 and C2.

One end of the sealing jaw 51 of the first sealing jaw moving unit 50a is supported by the distal end of the lever 91d, and the other end of the sealing jaw 51 of the first sealing jaw moving unit 50a is supported by the distal end of a lever 91e. The lever 91e is a member that rotates about the center-of-revolution C1, and the lever 91e is supported so as to be capable of relative rotation on the revolving shaft 95.

One end of the sealing jaw 51 of the second sealing jaw moving unit 50b is supported by the distal end of the lever 91f, and the other end of the sealing jaw 51 of the second sealing jaw moving unit 50b is supported by the distal end of a lever 91g. The lever 91g is a member that rotates about the center-of-revolution C2, and the lever 91g is supported so as to be capable of relative rotation on the revolving shaft 97.

One end of the sealing jaw 52 of the first sealing jaw moving unit 50a is supported by the distal end of the lever 92d, and the other end of the sealing jaw 52 of the first sealing jaw moving unit 50a is supported by the distal end of a lever 92e. The lever 92e is a member that rotates about the center-of-revolution C1, and the lever 92e is supported so as to be capable of relative rotation on the revolving shaft 94.

One end of the sealing jaw 52 of the second sealing jaw moving unit 50b is supported by the distal end of the lever 92f, and the other end of the sealing jaw 52 of the second sealing jaw moving unit 50b is supported by the distal end of a lever 92g. The lever 92g is a member that rotates about the center-of-revolution C2, and the lever 92g is supported so as to be capable of relative rotation on the revolving shaft 96.

Figure 18:
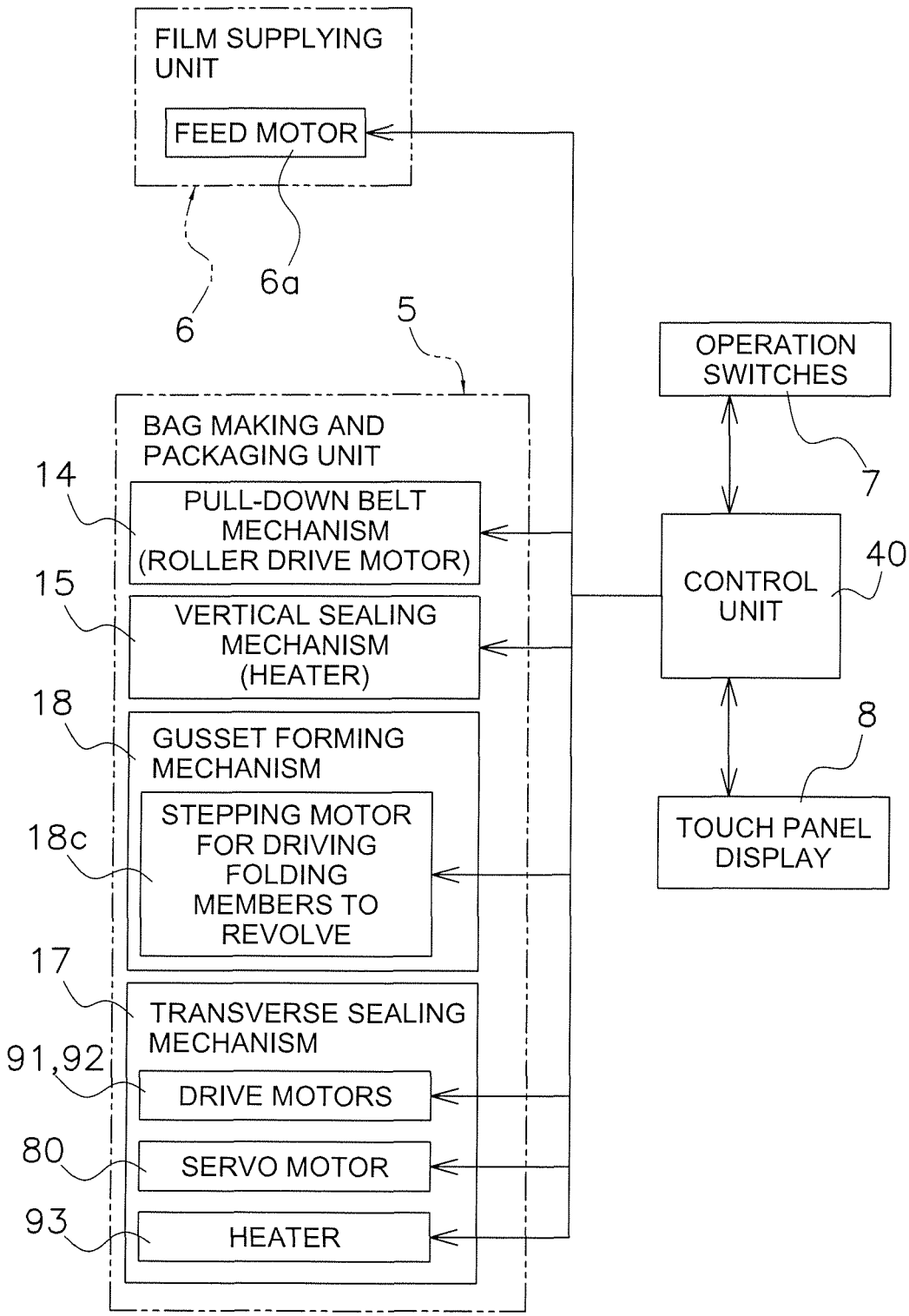
FIG. 18 is a control block diagram of the bag making and packaging machine.

Each of the sealing jaws 51 and 52 is a member formed extending longer than the dimension of the square tube-shaped film F in the vertical direction of FIG. 12 and has a heater 93 inside (see FIG. 18). Sealing surfaces of the sealing jaws 51 and 52 are heated by these heaters 93 such that parts of the square tube-shaped film F sandwiched by the left and right sealing jaws 51 and 51 (or the sealing jaws 52 and 52) are heat-sealed.

The Schmidt couplings 98 and 99 are shaft couplings that are configured from three discs coupled together by links and transmit the rotation of an input shaft to an output shaft. These Schmidt couplings 98 and 99 can transmit the rotation of the input shaft to the output shaft even when the output shaft moves planarly with respect to the planarly fixed input shaft and the distance between the axial centers of both changes.

Figure 13:
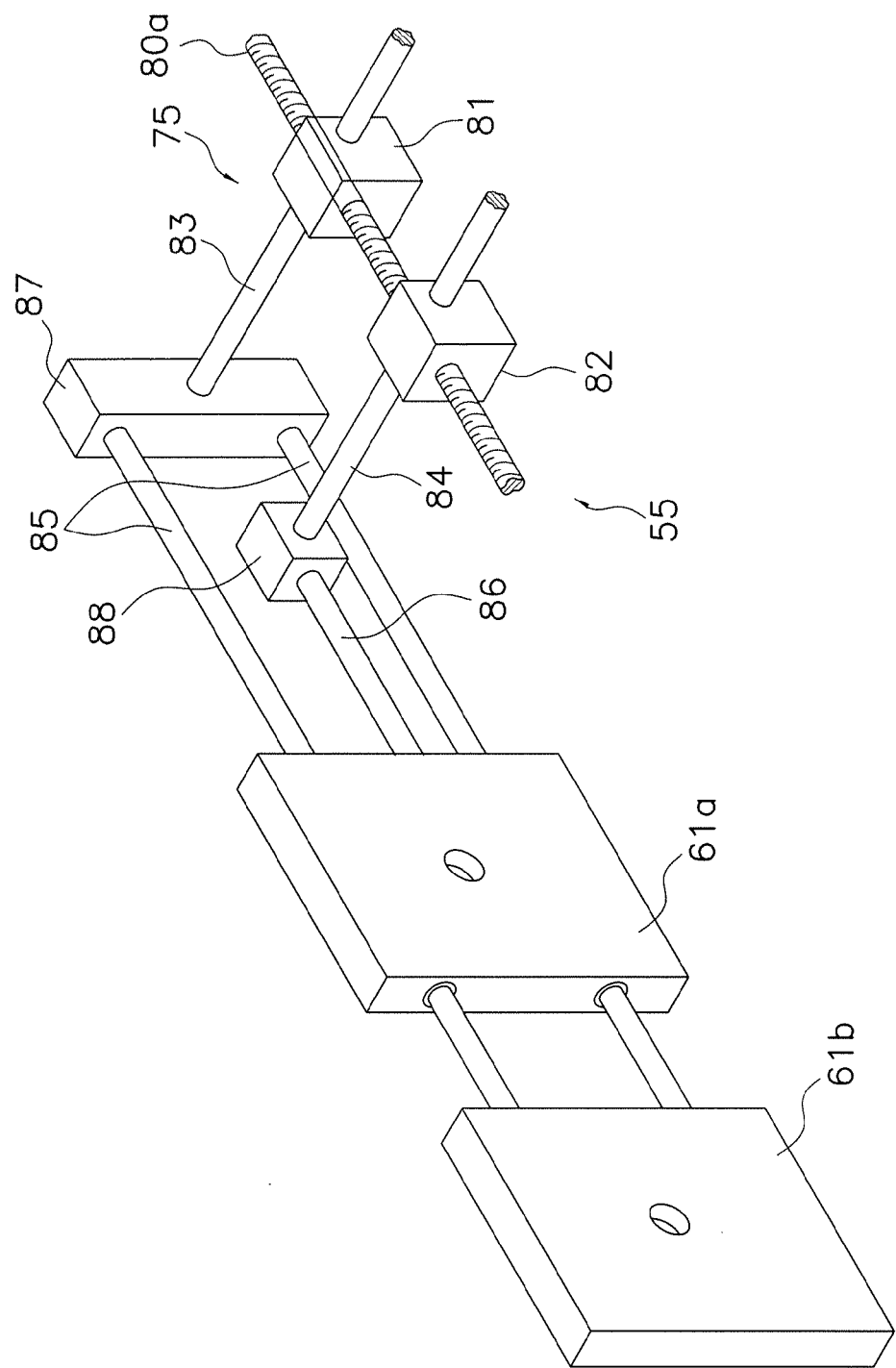
FIG. 13 is an external perspective view of a transverse direction drive mechanism.

Further, the revolving shafts 94, 95, 96, and 97 are pivotally supported on horizontally moving plates 62a, 61a, 62b, and 61b. These horizontally moving plates 62a, 61a, 62b, and 61b are horizontally moved by a transverse direction drive mechanism 55 shown in FIG. 13. The horizontally moving plates 61a and 62a undergo mutually the same movement, and the horizontally moving plates 61b and 62b undergo mutually the same movement. Here, the horizontally moving plates 61a and 61b will be taken as an example to describe the transverse direction drive mechanism 55. As shown in FIG. 13, the transverse direction drive mechanism 55 has a drive mechanism 75 for causing the horizontally moving plates 61a and 61b to move toward or away from each other and has guide portions and guide rails that support the horizontally moving plates 61a and 61b such that they may freely slide in the horizontal direction.

The drive mechanism 75 has a ball screw 80a that is rotated by a servo motor 80 (see FIG. 18), first and second nut members 81 and 82 that screw onto the ball screw 80a, first and second connecting rods 83 and 84 that are disposed so as to be orthogonal in the horizontal direction to the ball screw 80a, a pair of third connecting rods 85 that are disposed along the moving direction, and a fourth connecting rod 86 that is disposed parallel to the third connecting rods 85.

The first connecting rod 83 is connected to the pair of third connecting rods 85 via a coupling 87, and the distal ends of the pair of third connecting rods 85 are fixed to a side end surface of the horizontally moving plate 61b. The pair of third connecting rods 85 penetrate the horizontally moving plate 61a such that the horizontally moving plate 61a may freely slide thereon. Further, the second connecting rod 84 is connected to the fourth connecting rod 86 via a coupling 88, and the distal end of the fourth connecting rod 86 is fixed to a side end surface of the horizontally moving plate 61a.

Additionally, the portion of the ball screw 80a onto which the first nut member 81 is screwed and the portion of the ball screw 80a onto which the second nut member 82 is screwed have mutually opposite threads.

Because of this drive mechanism 75, when the ball screw 80a rotates, it becomes possible to cause the horizontally moving plates 61a and 61b to move toward and away from each other.

Configurations of Ironing Mechanisms 150 and Shutter Mechanisms 160 Relating to Transverse Sealing Mechanism 17

In the transverse sealing mechanism 17, in addition to the configuration described above, there are disposed shutter members 166 and stripper members 155 that operate interlockingly with the sealing jaws 51 and 52 to regulate the falling of the product C inside the square tube-shaped film Fm during the transverse sealing operation and to iron the square tube-shaped film Fm including the product C downward. Ironing mechanisms 150 that cause the stripper members 155 to operate interlockingly with the sealing jaws 51 and 52 and shutter mechanisms 160 that cause the shutter members 166 to operate interlockingly with the sealing jaws 51 and 52 will be described below.

Figure 14A:
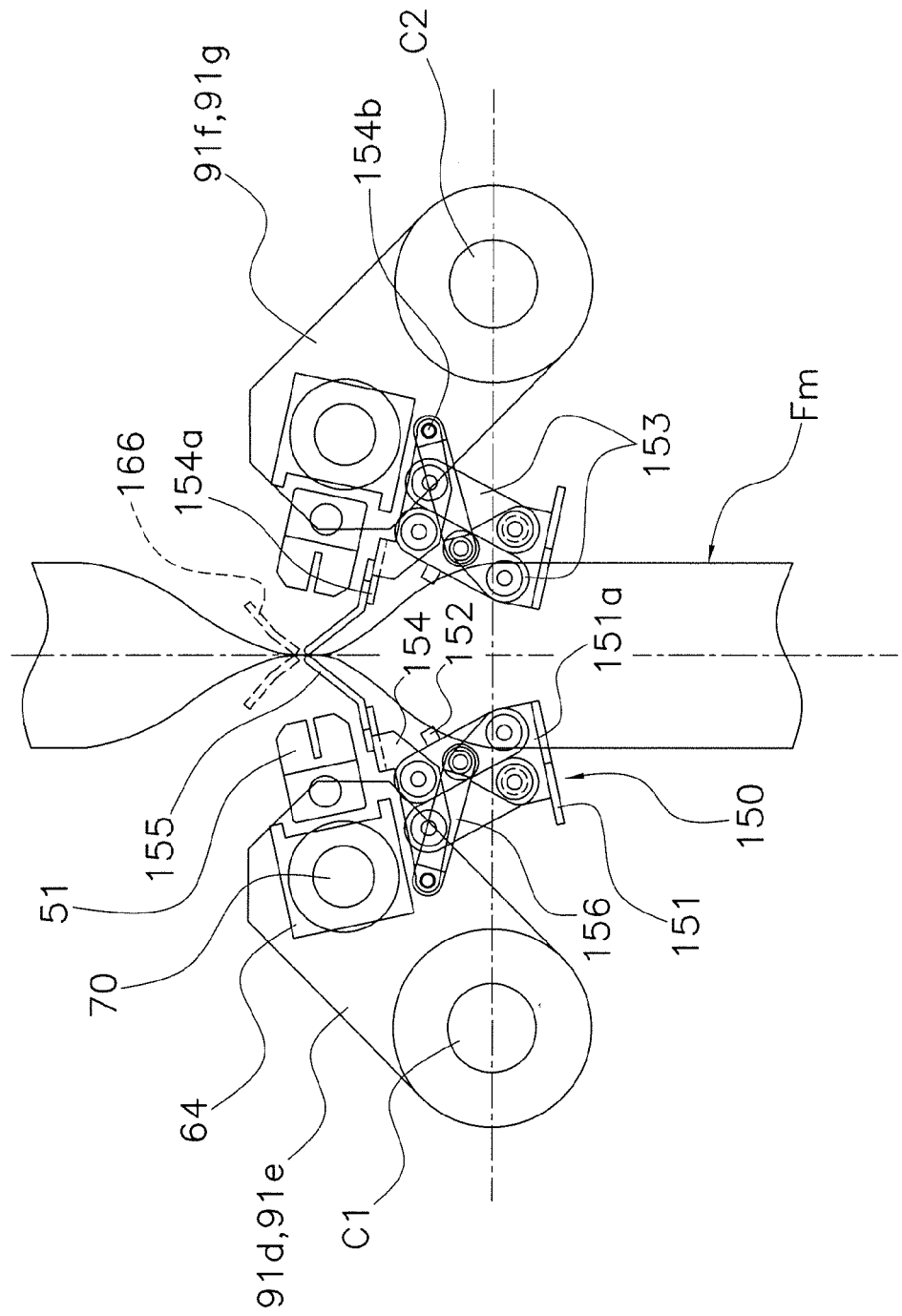
FIG. 14A is a state view of sealing jaws and stripper members.
Figure 14B:
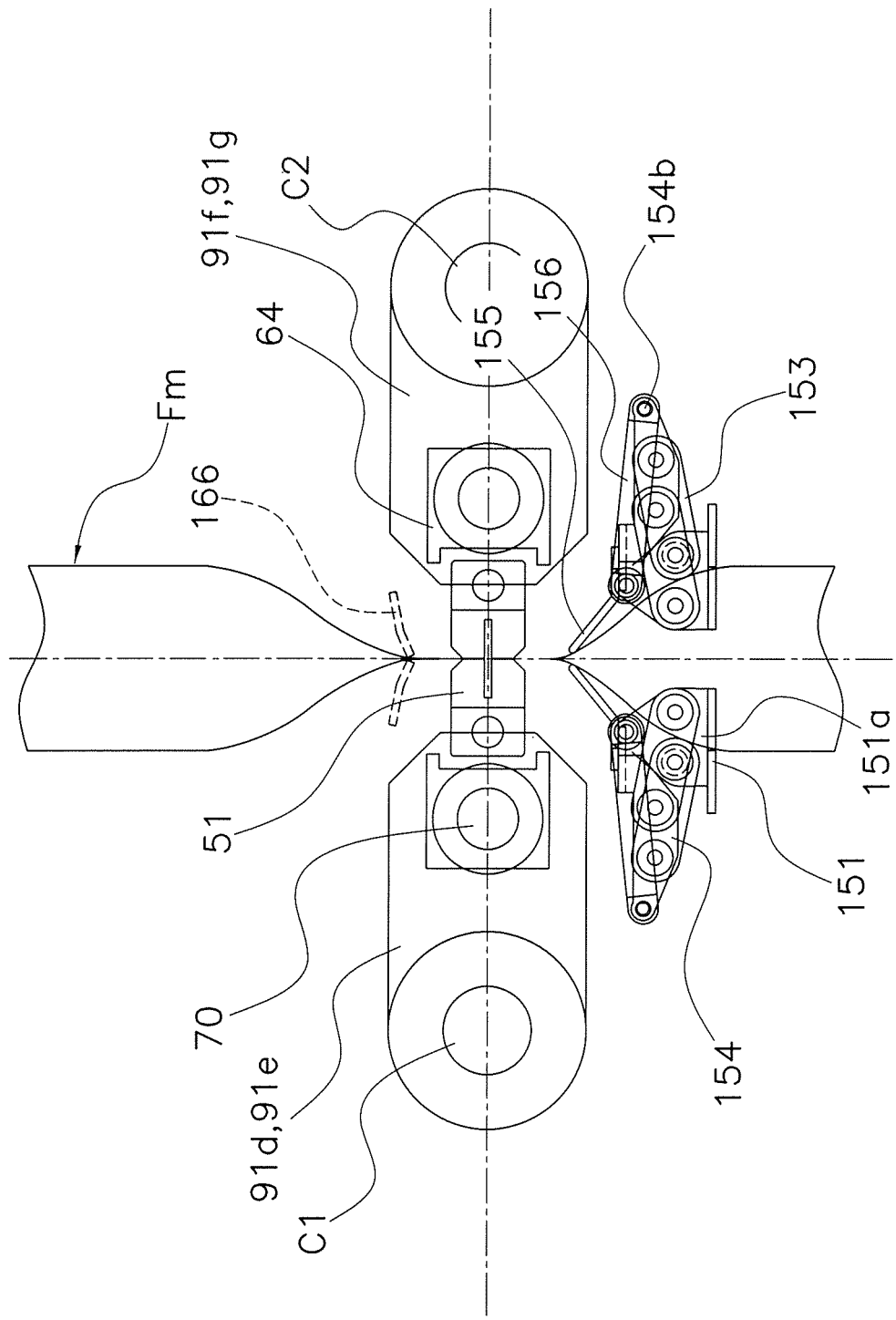
FIG. 14B is a state view of the sealing jaws and the stripper members.
Figure 14C:
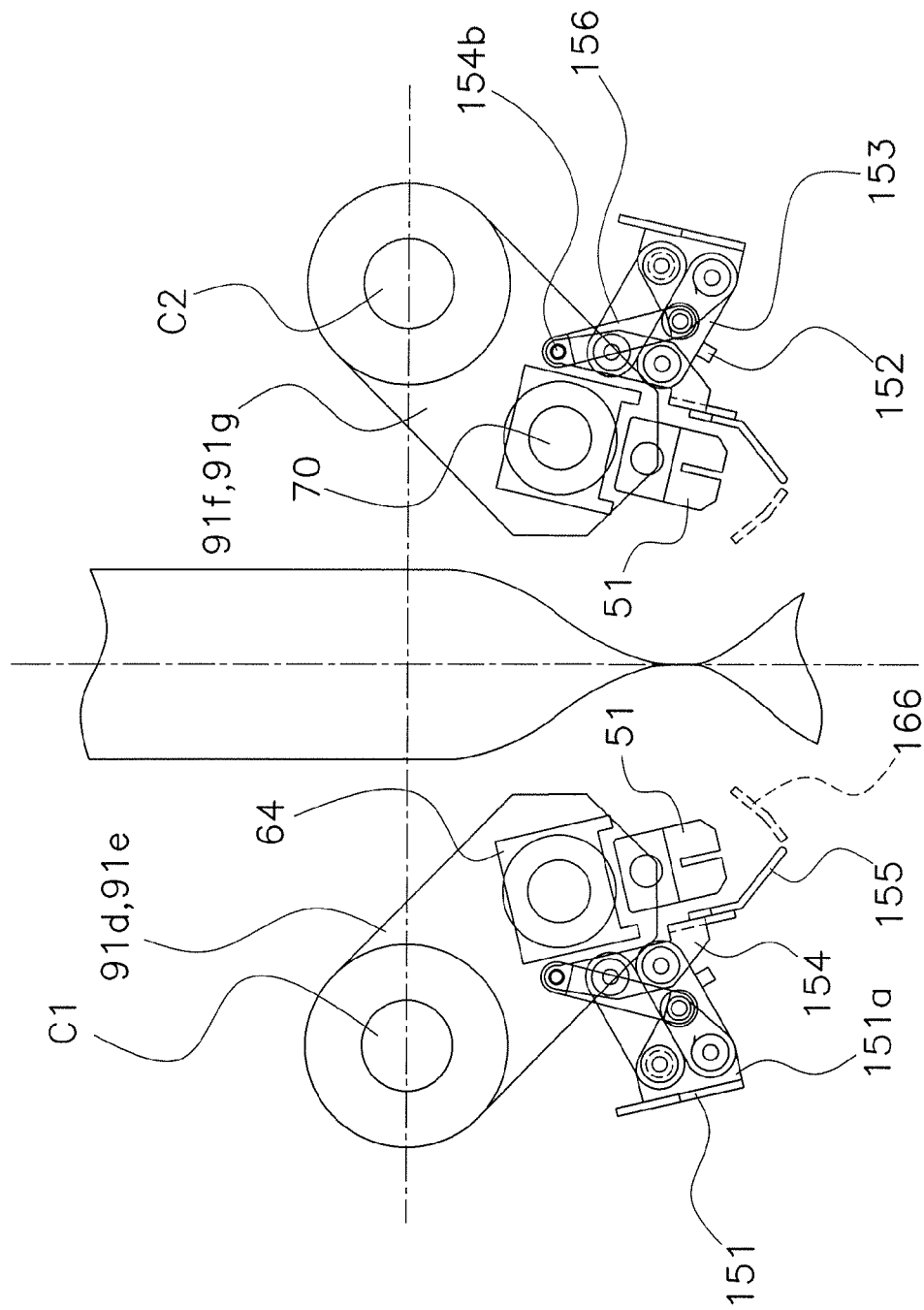
FIG. 14C is a state view of the sealing jaws and the stripper members.
Figure 17A:
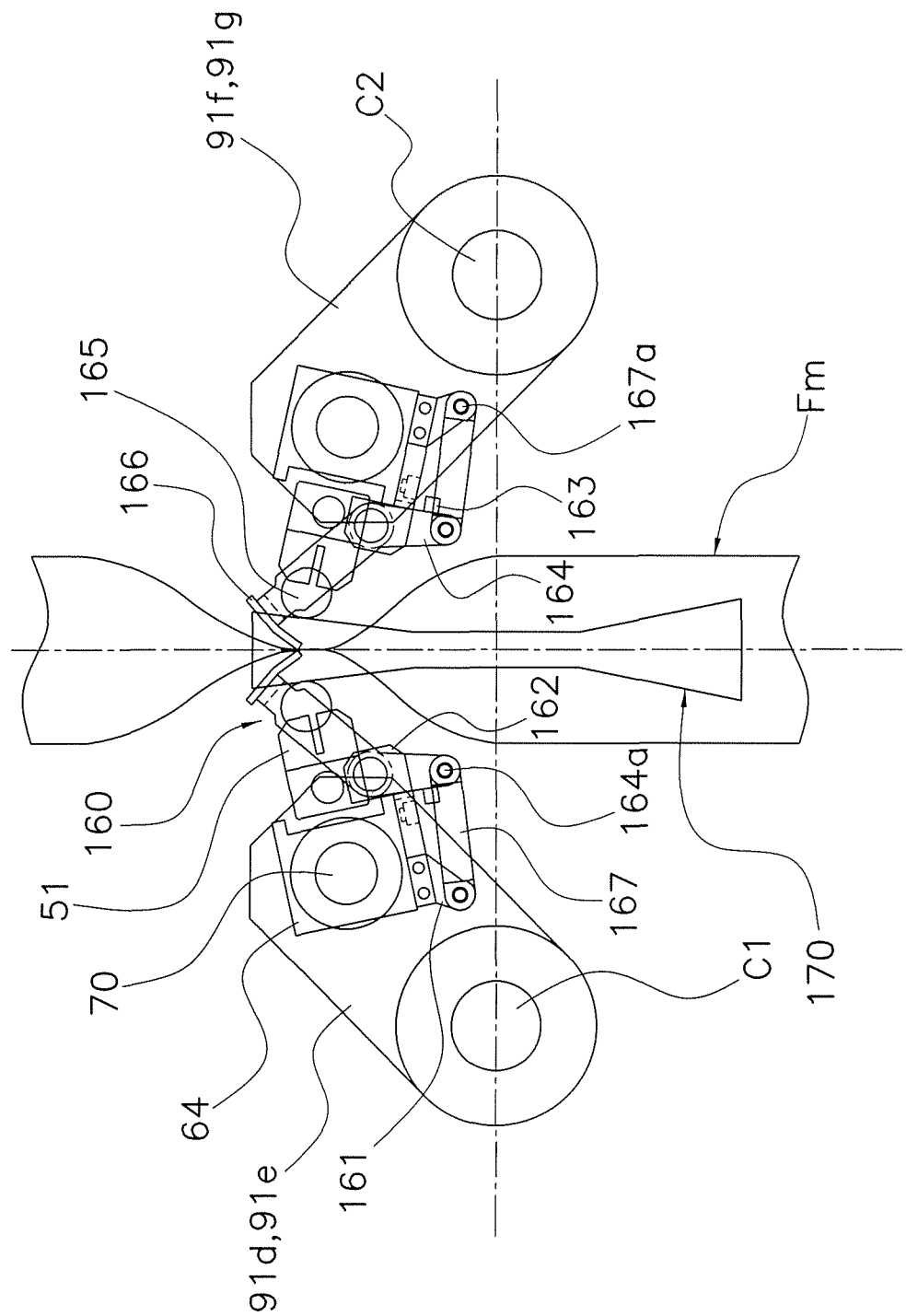
FIG. 17A is a state view of the sealing jaws and the stripper members.
Figure 17B:
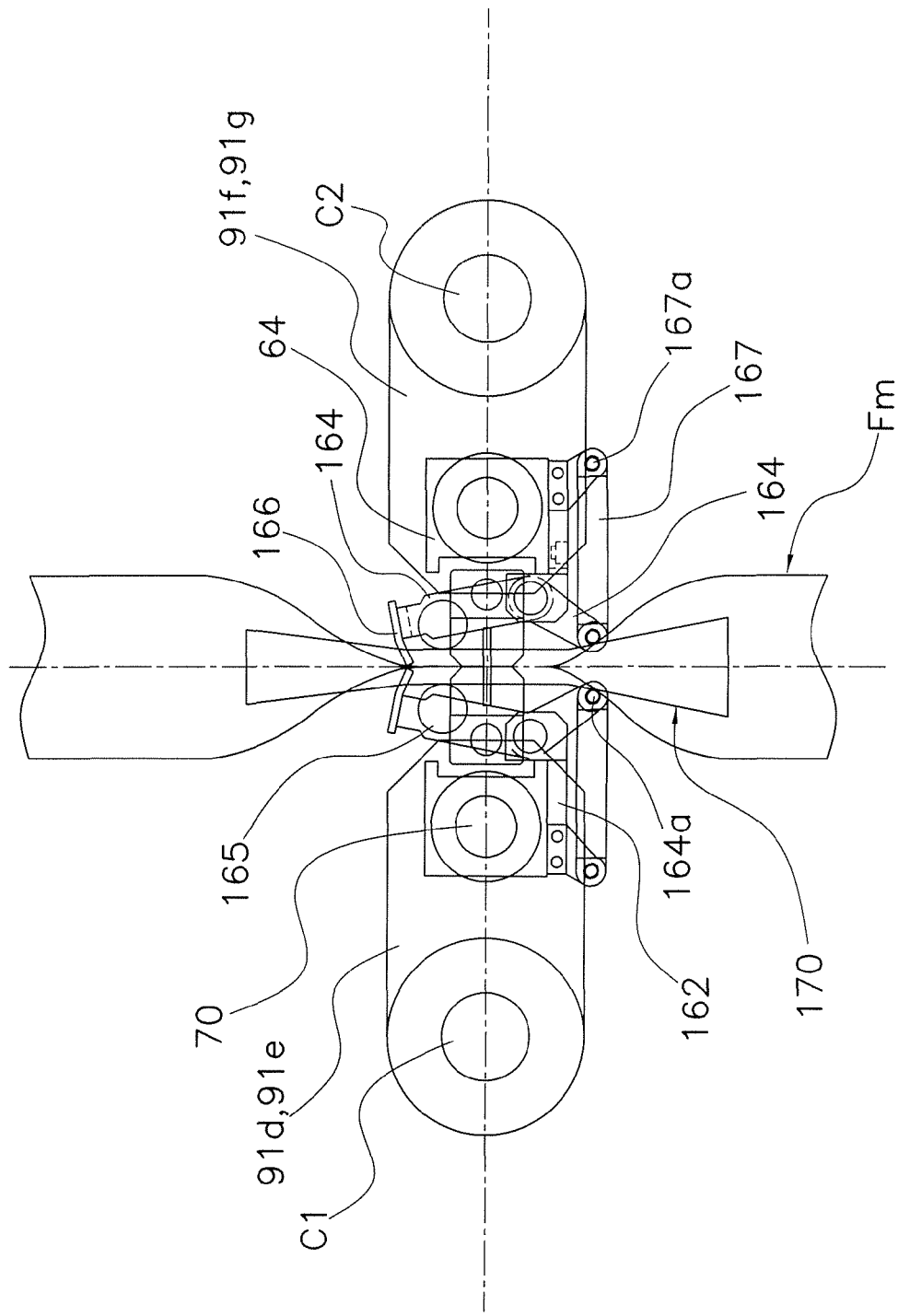
FIG. 17B is a state view of the sealing jaws and the stripper members.
Figure 17C:
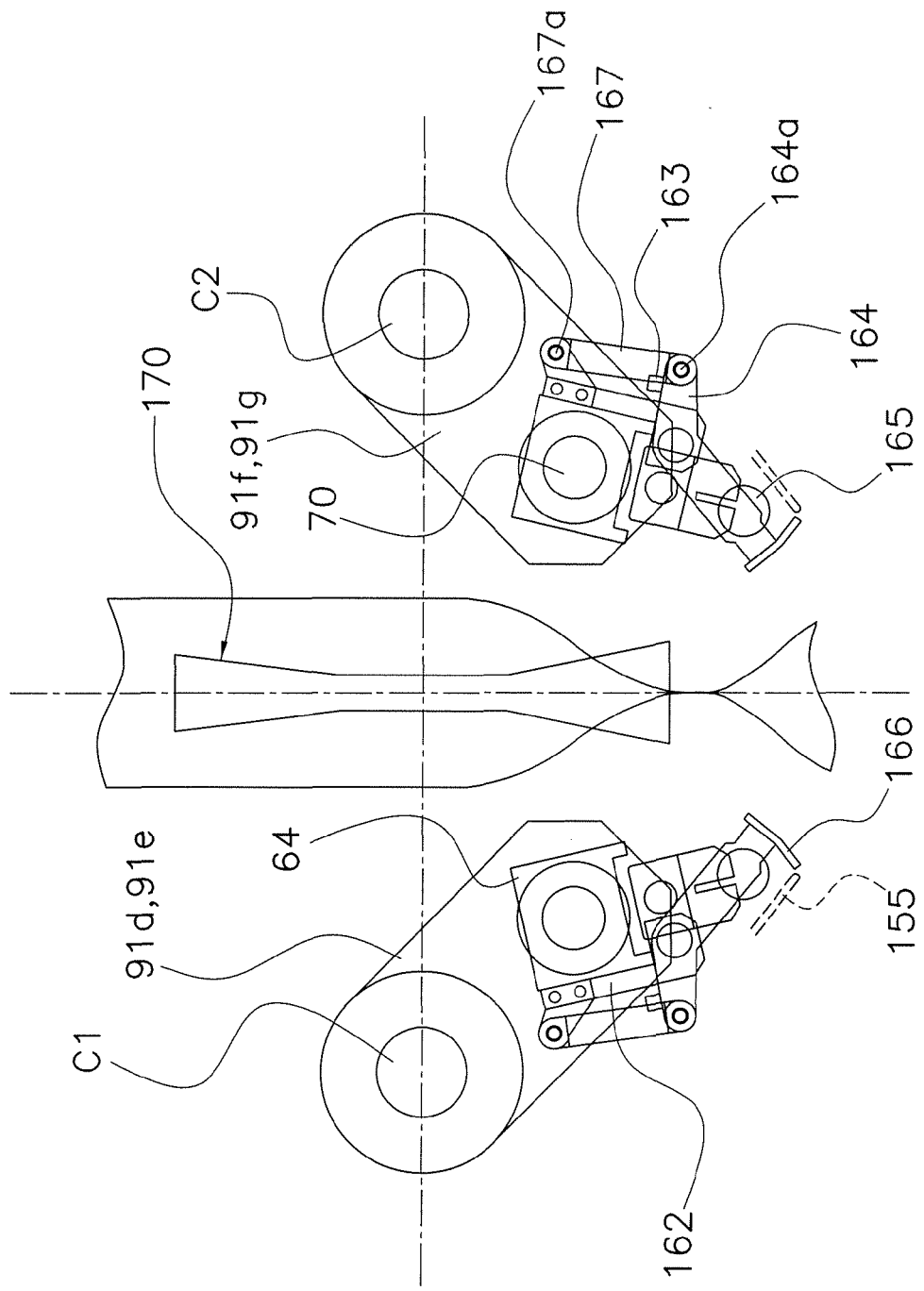
FIG. 17C is a state view of the sealing jaws and the stripper members.

In FIG. 14A to FIG. 14C and in FIG. 17A to FIG. 17C, each member is superposed and expressed by solid lines so that the movement of each member is easy to understand. Further, the ironing mechanisms 150 and the shutter members 166 with respect to the sealing jaws 51 and the ironing mechanisms 150 and the shutter members 166 with respect to the sealing jaws 52 have the same configurations, so the ironing mechanisms 150 and the shutter members 166 with respect to the sealing jaws 51 will be described below. In FIG. 7, FIG. 8, FIG. 11, and FIG. 12, the ironing mechanisms 150 and the shutter mechanisms 160 are omitted in order to facilitate understanding.

Configuration of Ironing Mechanisms 150

As shown in FIG. 14A and the like, the ironing mechanisms 150 are a left-and-right pair of mechanisms and are supported on base members 64 that support the sealing jaws 51 and 52. Although it is not mentioned above, the base members 64 are positioned between the levers 91d, 91e, 91f, 91g, 92d, 92e, 92f, and 92g and the sealing jaws 51 and 52 (see FIG. 12).

Each of the ironing mechanisms 150 is configured from an ironing fixed member 151, a stopper 152, parallel link members 153, an ironing moving member 154, the stripper member 155, and a spring member 156.

The ironing fixed members 151 are fixed so as to be incapable of relative movement with respect to the base members 64 that support the sealing jaws 51. Further, projecting portions 151a for pin-supporting end portions of each of the parallel link members 153 and end portions of the spring members 156 are formed on the ironing fixed members 151.

The stoppers 152 are also fixed so as to be incapable of relative movement with respect to the base members 64. As shown in FIG. 14C, the stoppers 152 fulfill the role of stopping the ironing moving members 154 that try to move in directions away from the centers-of-rotation C1 and C2 due to the tensile force of the spring members 156. As described later, when the stripper members 155 of the pair of both ironing mechanisms 150 press against each other, these stoppers 152 no longer act.

The parallel link members 153 are pairs of members placed away from each other in the longitudinal direction of the sealing jaws 51, with one end of each of the parallel link members 153 being pin-supported on the projecting portions 151a of the ironing fixed members 151 and with the other end of each of the parallel link members 153 being pin-supported on pin-supporting portions 154b of the ironing moving members 154. Because of these parallel link members 153, the ironing moving members 154 can move while generally maintaining their posture with respect to the ironing fixed members 151 (see FIG. 14A to FIG. 14C).

The ironing moving members 154 comprise intermediate portions 154a that extend longer than the width of the square tube-shaped film Fm in a direction perpendicular to the page of FIG. 14A and plate portions that are formed on both ends of the intermediate portions 154a. As described above, the plate portions on both ends of the ironing moving members 154 pin-support the end portions of the parallel link members 153 in the pin-supporting portions 154b. Further, each of the plate portions of the ironing moving members 154 pin-support end portions of the spring members 156 in the pin-supporting portions 154b close to the centers-of-rotation C1 and C2.

Like the sealing jaws 51, the stripper members 155 are members formed extending longer than the width of the square tube-shaped film Fm, and the stripper members 155 are fixed to the intermediate portions 154a of the ironing moving members 154. There is a slight time difference between the stripper members 155 and the shutter members 166 described later, so that the stripper members 155 sandwich the square tube-shaped film Fm earlier than the sealing jaws 51 as shown in FIG. 14A and iron the portion-to-be-sealed of the square tube-shaped film Fm as shown in FIG. 14B.

Figure 15A:
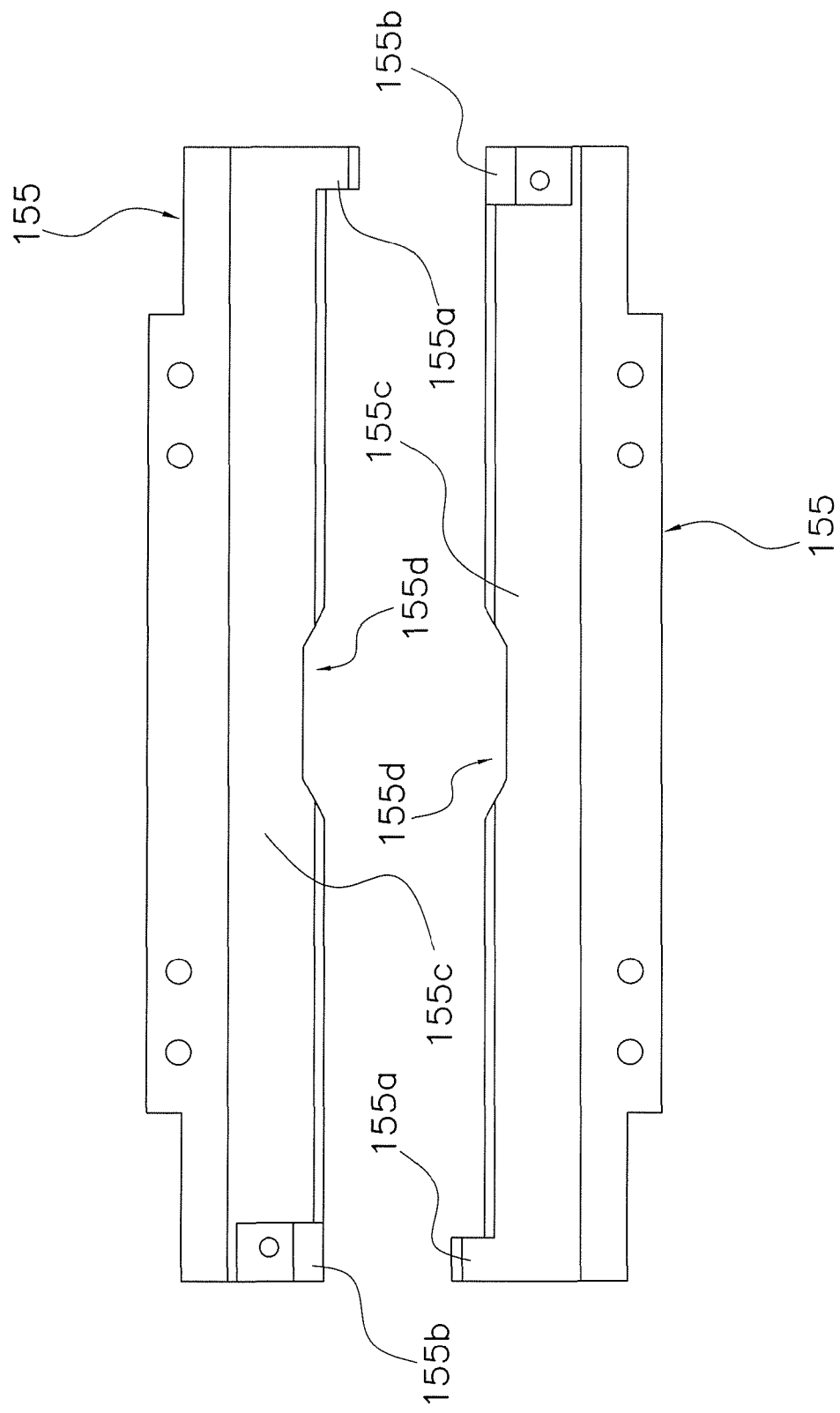
FIG. 15A is a top view of the pair of stripper members.
Figure 15B:
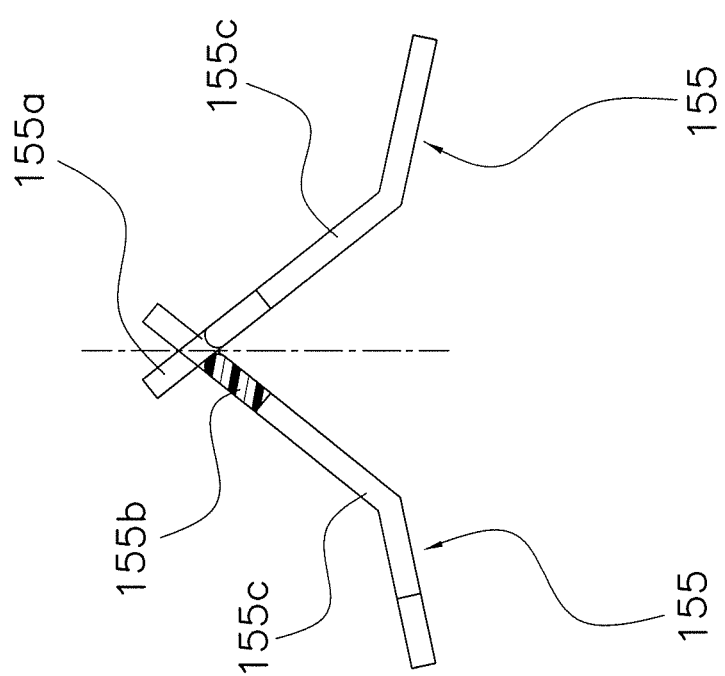
FIG. 15B is a view showing the relationship between end portions of the pair of stripper members in the state shown in FIG. 15A.

Further, FIG. 15A shows a top view of the pair of stripper members 155 before they reach a state immediately before the ironing operation shown in FIG. 14A, and FIG. 15B shows details of the relationship between both at the end portions of the pair of stripper members 155 in the state immediately before the ironing operation shown in FIG. 14A. As shown in these drawings, the stripper members 155 of the two ironing mechanisms 150 that form a pair have body portions 155c made of metal that touch the square tube-shaped film Fm, projecting portions 155a made of metal that project outward on one end of each of the body portions 155c, and resin portions 155b. The projecting portions 155a are placed so as to lock to the resin portions 155b of the opposing stripper members 155 in the period of time around transverse sealing—that is, in the states shown in FIG. 14A and FIG. 14B (see FIG. 15B).

Moreover, when the pair of stripper members 155 iron the portion-to-be-sealed (transverse sealing target portion) of the square tube-shaped film Fm, the pair of stripper members 155 let out air from the space inside the square tube-shaped film Fm below the transverse sealing target portion to the space inside the square tube-shaped film Fm above the transverse sealing target portion. For this reason, cutouts 155d are formed in the central portions of the body portions 155c. Like the sealing jaws 51, the body portions 155c press the portions of the front and rear long edges interconnecting both side portions of the square tube-shaped film Fm from the front and from the rear (see FIG. 16A). Additionally, because the cutouts 155d are formed in the centers of the body portions 155c, portions 155c1 (hereinafter called stripper central portions 155c1) that press against the central portion between both side portions of the square tube-shaped film Fm are recessed away from the body portions 155c of the other stripper members 155 more than portions 155c2 (hereinafter called stripper side portions 155c2) that press against both side portions, and the neighborhoods of both side portions, of the square tube-shaped film Fm in which the gussets are formed (see FIG. 16A). As a result, in the pair of stripper members 155 that touch the square tube-shaped film Fm and move downward at a faster speed than the square tube-shaped film Fm before the transverse sealing processing, of the space inside the portions of the square tube-shaped film Fm touched by the stripper members 155, a second space S12 inside the central portion between both side portions of the square tube-shaped film Fm becomes larger than first spaces S11 inside both side portions of the square tube-shaped film Fm in which the gussets have been formed.

Figure 15C:
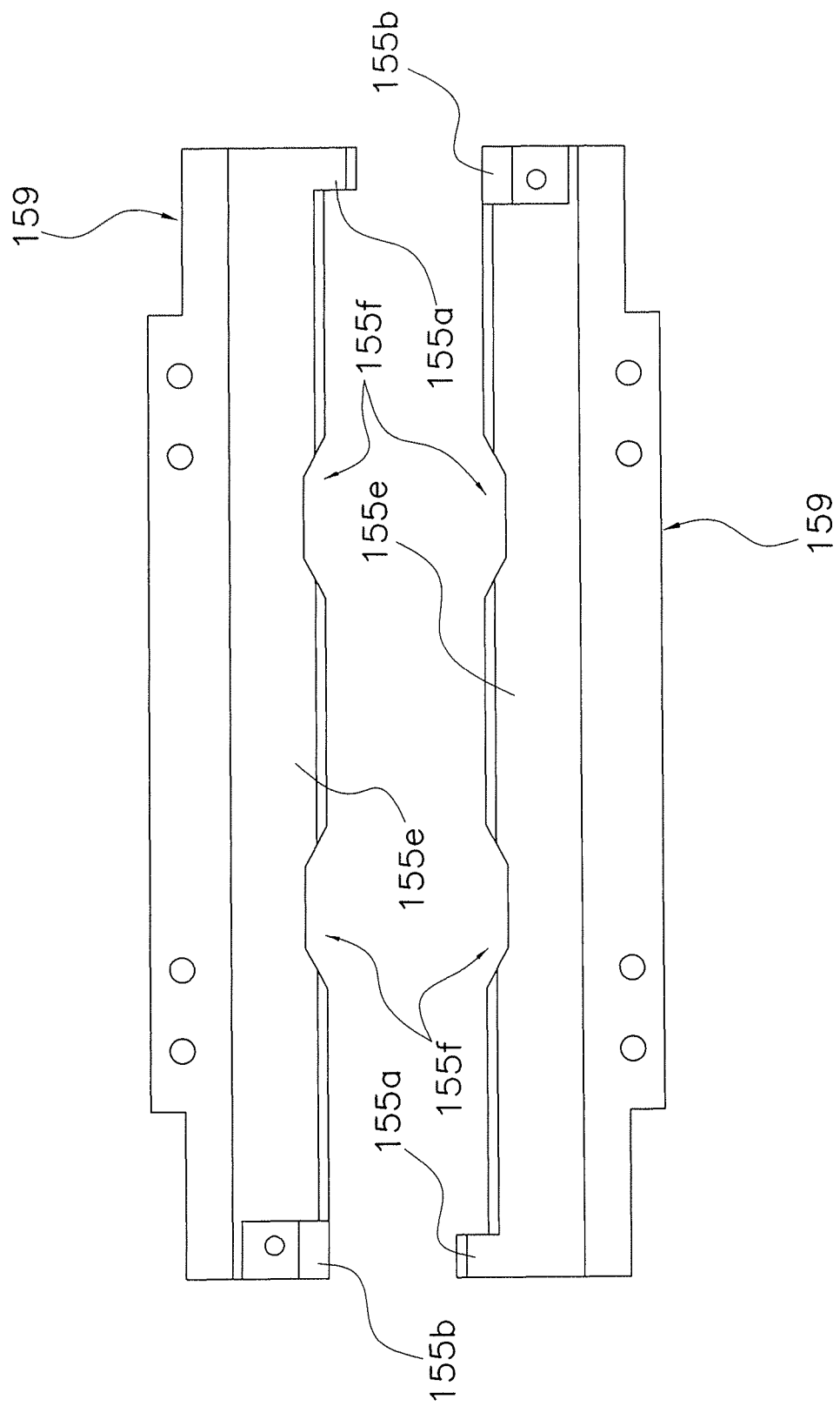
FIG. 15C is a top view of a pair of stripper members for a film in which gussets are not formed.

As described above, when the packaging material that becomes the target of the transverse sealing processing is the square tube-shaped film Fm (a first packaging material) in which the gussets have been formed in both side portions, then the stripper members 155, by which a deaerating portion (the second space S12) that lets out air when the stripper members sandwich the square tube-shaped film Fm forms only in the central portion between both side portions of the square tube-shaped film Fm (the first packaging material), are used as the stripper members. On the other hand, when the packaging material that becomes the target of the transverse sealing processing is a square tube-shaped (or cylindrical) tubular film Fm1 (a second packaging material) such as shown in FIG. 16B where gussets are not formed in both side portions, then a pair of second stripper members 159, with which deaerating portions (spaces S21) that let out air when the stripper members sandwich the tubular film Fm1 form at least in both side portions of the tubular film Fm1 (the second packaging material), are used as the stripper members. As shown in FIG. 15C and FIG. 16B, the second stripper members 159 have body portions 155e made of metal that touch the tubular film Fm1, projecting portions 155a made of metal that project outward from one end of each of the body portions 155e, and resin portions 155b. The projecting portions 155a and the resin portions 155b are the same as those portions of the stripper members 155 described above. Cutouts 155f are formed in both side portions of the body portions 155e. Specifically, as shown in FIG. 16B, the cutouts 155f are formed in the body portions 155e such that, when the pair of stripper members 159 are performing the ironing operation, deaerating portions (the spaces S21) that let out air form in both side portions of the tubular film Fm1 and only a small clearance (a space S22) forms in the central portion of the tubular film Fm1.

One end of each of the spring members 156 is pin-supported on the projecting portions 151a of the ironing fixed members 151, and the other end of each of the spring members 156 is pin-supported on the pin-supporting portions 154b close to the centers-of-rotation C1 and C2 of the ironing moving members 154. As shown in FIG. 14B, the spring members 156 energize the ironing moving members 154 and the stripper members 155 toward the opposing ironing mechanisms 150 at the time of transverse sealing. Thus, the pair of stripper members 155 contact at both of their end portions in a state where the above described projecting portions 155a and the resin portions 155b press each other, and the pair of stripper members 155 form a predetermined clearance (a clearance including the first spaces S11 and the second space S12 shown in FIG. 16A) between both of the body portions 155c.

Each of the members of the ironing mechanisms 150 excluding the ironing moving members 154 and the stripper members 155 are respectively disposed with respect to both ends of the stripper members 155.

Configuration of Shutter Mechanisms 160

The shutter mechanisms 160 are a left-and-right pair of mechanisms and are each supported on the base members 64 (see FIG. 17A). Each of the shutter mechanisms 160 is configured from shutter fixed members 161 and 162, a stopper 163, a V-shaped member 164, a shutter-use bearing 165, the shutter member 166, and a spring member 167. Further, the bag making and packaging machine 3 of the present embodiment has a shutter-use cam 170 that guides the shutter-use bearings 165 around the time of transverse sealing. The shutter-use cam 170 is configured in a shape that has an outer surface including a slanted surface such as shown in FIG. 17A such that the dimension of the clearance between the pair of both shutter members 166 does not change even because of a change in the posture of the shutter members 166 in a series of transverse sealing operations.

The shutter fixed members 161 and 162 are fixed so as to be incapable of relative movement with respect to the base members 64 that support the sealing jaws 51. End portions of the spring members 167 are pin-supported on the shutter fixed members 161. The shutter fixed members 162 pin-support intermediate portions of the V-shaped members 164.

The stoppers 163 are also fixed so as to be incapable of relative movement with respect to the base members 64. As shown in FIG. 17C, these stoppers 163 fulfill the role of stopping the V-shaped members 164 that try to rotate because of the tensile force of the spring members 167. In a state where the force from the shutter-use cam 170 acts on a shutter-use cam follower and the spring members 167 are extending, these stoppers 163 no longer act.

As described above, the intermediate portions of the V-shaped members 164 are pin-supported on the shutter fixed members 162. The shutter members 166 are fixed to distal ends of the V-shaped members 164. Further, the shutter-use bearings 165 are mounted such that they may freely rotate in the neighborhoods of the fixed portions of the shutter members 166. These shutter-use bearings 165 roll along the outer surface of the shutter-use cam 170 shown in FIG. 17A at the time of transverse sealing and in the period of time around transverse sealing. Thus, the distance of the clearance between both of the pair of shutter members 166 becomes held at a substantial constant in the period of time around transverse sealing (see FIG. 17A and FIG. 17B). End portions 164a of the V-shaped members 164 on the sides where the shutter members 166 are not fixed pin-support end portions of the spring members 167.

Like the sealing jaws 51, the shutter members 166 are members formed extending longer than the width of the square tube-shaped film Fm, and both ends of each of the shutter members 166 are fixed to the distal ends of the V-shaped members 164. The shutter members 166 sandwich the square tube-shaped film Fm earlier than the sealing jaws 51 together with the stripper members 155 and suppress falling of the product C above the portion-to-be-sealed at the time of transverse sealing of the square tube-shaped film Fm (see FIG. 17B).

The pair of shutter members 166 touch the square tube-shaped film Fm and sandwich the square tube-shaped film Fm slightly earlier than the pair of stripper members 155.

One end of each of the spring members 167 is supported on the shutter fixed members 161 by pins 167a, and the other end of each of the spring members 167 is pin-supported on the end portions 164a of the V-shaped members 164. As shown in FIG. 17B, at the time of transverse sealing, the spring members 167 fulfill the role of pressing the shutter-use bearings 165 against the shutter-use cam 170 by pulling the end portions 164a of the V-shaped members 164.

General Operation of Bag Making and Packaging Machine 3

Next, the operation of the bag making and packaging machine 3 will be described.

First, the operation of the bag making and packaging machine 3 until the transverse sealing processing will be described on the basis of FIG. 7.

The sheet-like film F sent from the film supplying unit 6 to the forming mechanism 13 is wrapped around the tube 13b from the former 13a, is formed into a square tube shape, and is conveyed as is downward by the pull-down belt mechanism 14. Then, in the state where the film F is wrapped around the tube 13b, both end portions of the film F become superimposed on the peripheral surface, and that superimposed portion is vertically sealed by the vertical sealing mechanism 15.

The square tube-shaped film Fm that has been vertically sealed leaves the tube 13b and descends toward the transverse sealing mechanism 17. Further, at this time, a mass of the product C falls through the tube 13b from the combinatorial weighing machine 2. Then, in regard to the square tube-shaped film Fm in which the gussets have been formed by the gusset forming mechanism 18, in the state where the product C is inside, the portion that becomes the upper end of a bag B and the portion that becomes the lower end of a bag above that bag B are transversely heat-sealed by the pair of sealing jaws 51 and 51 (or the sealing jaws 52 and 52) that revolvingly move while following annular loci.

General Operation of Bag Making and Packaging Machine 3 in Gusset Forming Processing Next, the operation when the gussets G (see FIG. 9 and FIG. 5B) are formed in both side portions of the square tube-shaped film Fm by the gusset forming mechanism 18 will be described.

At the stage before the gussets are formed, the transverse sectional shape of the square tube-shaped film Fm is substantially rectangular. Further, both side portions of the square tube-shaped film Fm that the folding members 18a and 18b of the gusset forming mechanism 18 press against are portions on the short sides of the substantially rectangular shape when seen in a transverse section (see FIG. 9).

Before the transverse sealing processing in the transverse sealing mechanism 17 is performed, the folding members 18a and 18b press against both side portions of the square tube-shaped film Fm and form the gussets G in both side portions of the square tube-shaped film Fm.

Further, the pair of folding members 18a and 18b revolvingly move interlockingly with the movement of the sealing jaws 51 and 52 of the transverse sealing mechanism 17 placed on the immediate downstream side of the pair of folding members 18a and 18b. Specifically, the pair of folding members 18a and 18b move from the state where they are contacting the square tube-shaped film Fm to retracted positions immediately before the sealing jaws 51 and 51 (or the sealing jaws 52 and 52) press against each other while revolvingly moving in D-like shapes and perform the transverse sealing processing. Thus, a situation where the folding members 18a and 18b end up becoming sandwiched between the sealing jaws 51 and 51 (or the sealing jaws 52 and 52) during the transverse sealing processing is avoided. This will be described in detail later.

Operation of Transverse Sealing Processing
Including Operation of Ironing Mechanisms and
Operation of Shutter Mechanisms Next, the operation of the transverse sealing mechanism 17 will be described.

In the transverse sealing mechanism 17, the drive motors 91 and 92 are actuated, whereby the revolving shafts 94, 95, 96, and 97 rotate, and the servo motor 80 is actuated, whereby the revolving shafts 94 and 95 of the first sealing jaw moving unit 50a and the revolving shafts 96 and 97 of the second sealing jaw moving unit 50b horizontally move. These motors 91, 92, and 80 are controlled by the control unit 40, whereby each of the sealing jaws 51 and 52 revolve while following substantially D-like loci (see the two-dotted chain lines in FIG. 11). Then, as shown in FIG. 14B and FIG. 17B, the upper end portion of the preceding bag and the lower end portion of the following bag are transversely sealed at substantially the same time, and the preceding bag and the trailing square tube-shaped film Fm are cut apart by cutter mechanisms (not shown) built inside the sealing jaws 51.

The ironing mechanisms 150 and the shutter mechanisms 160 are supported on the base members 64 and basically revolve about the centers-of-revolution C1 and C2 together with the sealing jaws 51. However, the stripper members 155 of the ironing mechanisms 150 and the shutter members 166 of the shutter mechanisms 160 are connected to the base members 64 via the parallel link members 153 and the V-shaped members 164, so around the time of transverse sealing, they move at a speed that differs from the moving speed of the sealing jaws 51.

FIG. 14A shows a state before the sealing processing where the sealing jaws 51 are not touching the square tube-shaped film Fm and where the stripper members 155 sandwich the square tube-shaped film Fm, and FIG. 17A shows a state before the sealing processing where the sealing jaws 51 are not touching the square tube-shaped film Fm and where the shutter members 166 sandwich the square tube-shaped film Fm. In the present embodiment, in order to facilitate understanding, each of the mechanisms 150 and 160 are shown divided between FIG. 14A and FIG. 17A. Further, FIG. 14B and FIG. 17B show a state where the sealing jaws 51 are touching the square tube-shaped film Fm and heat sealing (transverse sealing) is being performed. Moreover, FIG. 14C and FIG. 17C show a state immediately after heat sealing has been completed and each of the mechanisms 150 and 160 have separated from the square tube-shaped film Fm.

Figure 16A:
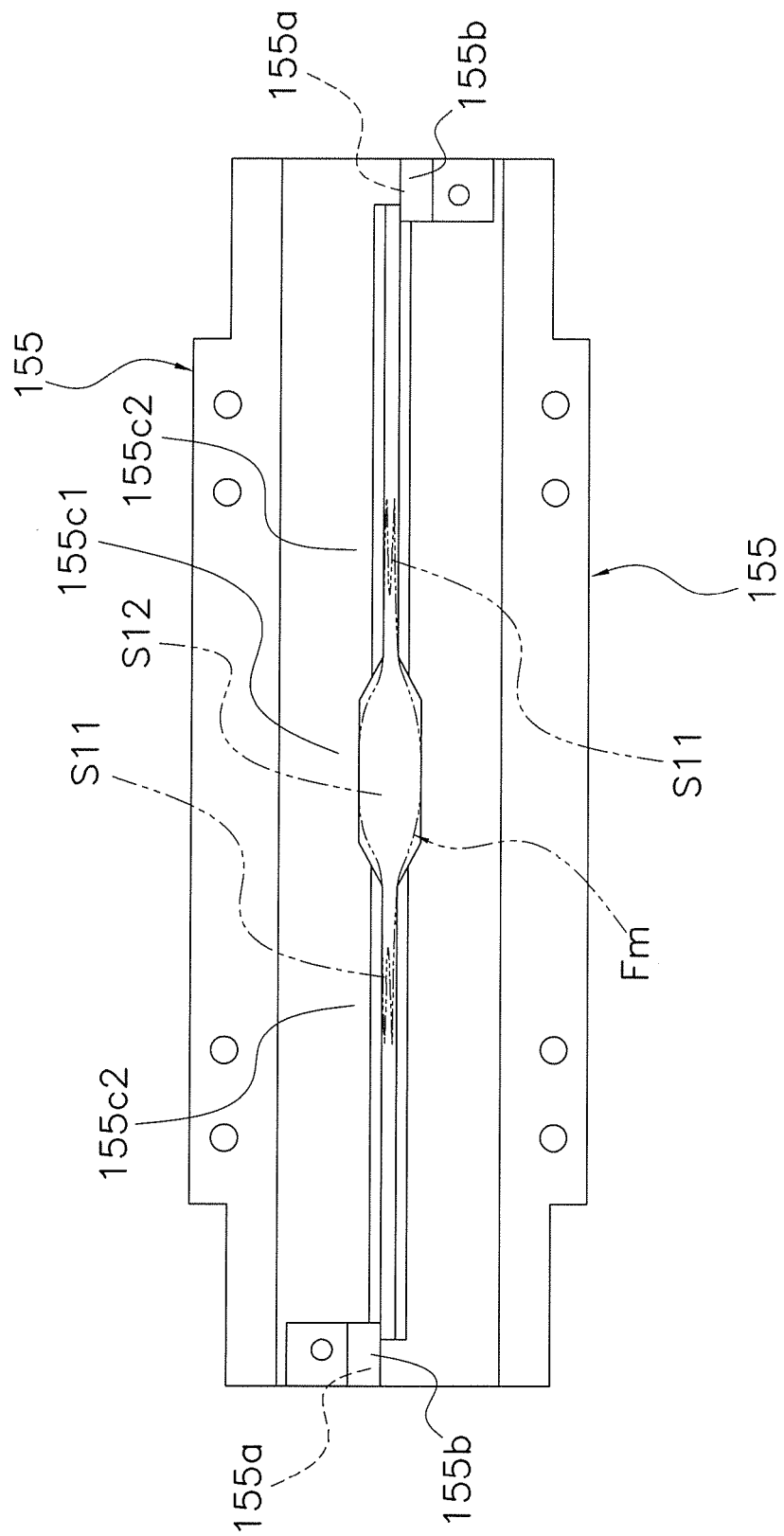
FIG. 16A is a top view when the pair of stripper members sandwich a square tube-shaped film.
Figure 16B:
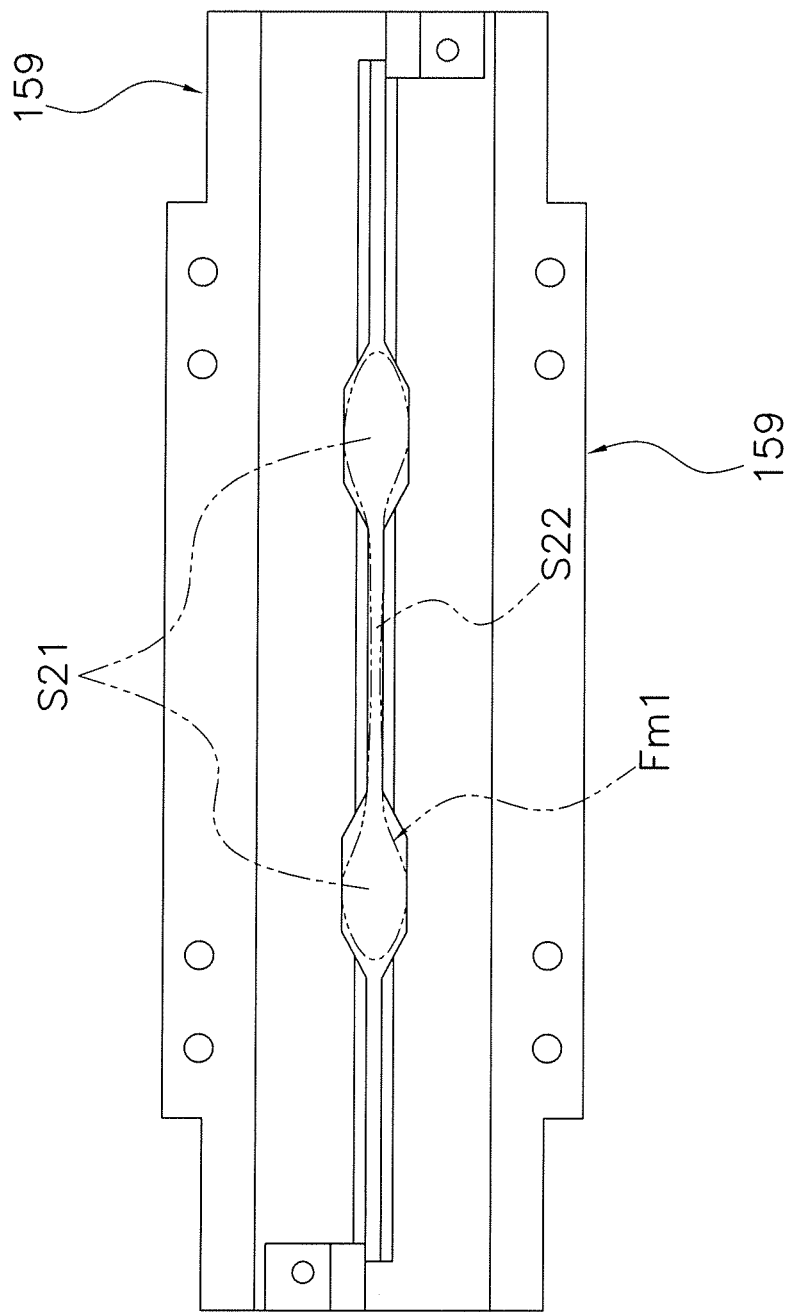
FIG. 16B is a top view when the pair of stripper members for the film in which gussets are not formed sandwich a tubular film.

In the transverse sealing operation, the sealing jaws 51 move transversely as is interlockingly with the movement of the centers-of-revolution C1 and C2, and the clearance between the pair of stripper members 155 is held by the pressing together of the projecting portions 155a on the one hand and the resin portions 155b on the other hand (see FIG. 16A). Further, the clearance between the shutter members 166 of the shutter mechanisms 160 is held by the guidance of the shutter-use bearings 165 resulting from the shutter-use cam 170. That is, during the period of time of the transverse sealing operation, the clearance between both of the stripper members 155 and the clearance between both of the shutter members 166 are held generally at constants.

As will be understood by comparing FIG. 14A and FIG. 14B, the stripper members 155 and the shutter members 166 that touch vertically adjacent portions of the square tube-shaped film Fm at the early stage of the transverse sealing operation (see FIG. 14A) change to a state where they are respectively touching different vertical positions of the square tube-shaped film Fm when the pair of sealing jaws 51 are sandwiching the square tube-shaped film Fm and performing heat sealing (see FIG. 14B). The distal ends of the stripper members 155 touch the square tube-shaped film Fm and thereafter move downward at a faster speed than the sealing jaws 51 because of the change in posture of the parallel link members 153. That is, the stripper members 155 move downward relatively while changing their posture with respect to the sealing jaws 51 and transfer the product C inside the transverse sealing target portion of the square tube-shaped film Fm downward. Further, the distal ends of the shutter members 166 touch the square tube-shaped film Fm and thereafter move downward because of the rotation of the V-shaped members 164. That is, the shutter members 164 move relatively upward (absolutely downward) while changing their posture with respect to the sealing jaws 51 and guard the space inside the transverse sealing target portion of the square tube-shaped film Fm such that the product C (contents) does not come falling therein from above.

Interlocking Control of Gusset Forming Mechanism
18 and Transverse Sealing Mechanism 17 by Control
Unit 40

Next, the interlocking control of the gusset forming mechanism 18 and the transverse sealing mechanism 17 that the control unit 40 performs will be described.

Figure 10:
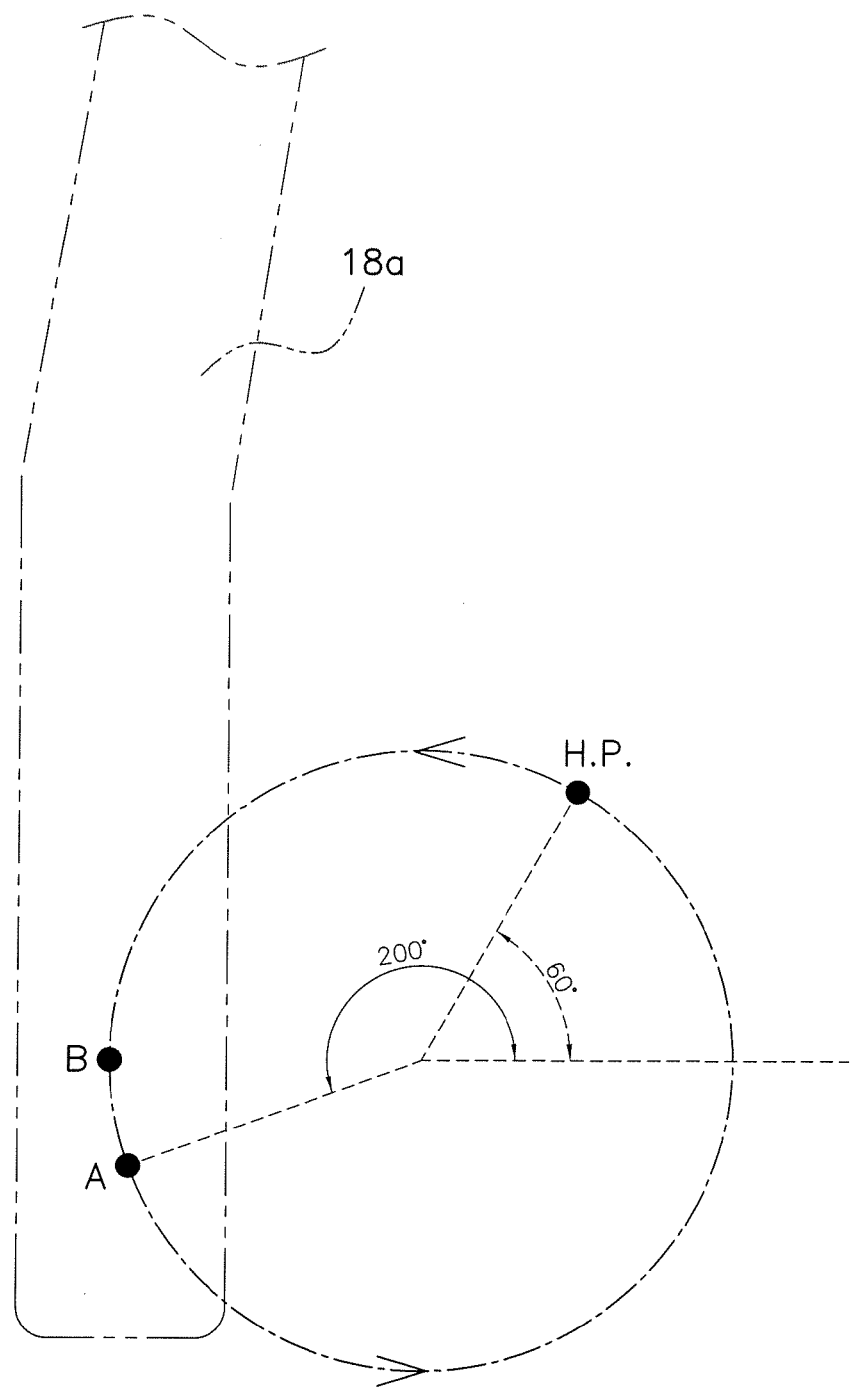
FIG. 10 is a view showing main positions along the circular trajectory of a folding member.

FIG. 10 shows the locus of movement of the folding member 18a of the gusset forming mechanism 18. The locus of movement of the folding member 18b is symmetrical to the locus of movement of the folding member 18a, so description thereof will be omitted here. A home position (H.P.) of the folding member 18a is a position 60° forward of a point farthest from the folding member 18b.

As shown in FIG. 10, the folding member 18a revolves along a circular trajectory, and the speed of the folding member 18a is changed by a command outputted from the control unit 40 to the motor 18c.

The control unit 40 decides the revolving speeds of the sealing jaws 51 and 52 of the transverse sealing mechanism 17 and the like depending on the bag size and the quantity of bags to be made per unit time and the like, which are set by the user. For this reason, the control unit 40 can cause the folding member 18a of the gusset forming mechanism 18 to revolve to match the movement of the sealing jaws 51 and 52, the shutter members 166, and the stripper members 155 of the transverse sealing mechanism 17. Here, the control unit 40 interlockingly controls the motor 18c of the gusset forming mechanism 18 and the drive motors 91 and 92 of the transverse sealing mechanism 17 such that each of interlocking operations shown in FIG. 19 and described below arise.

Figure 19:
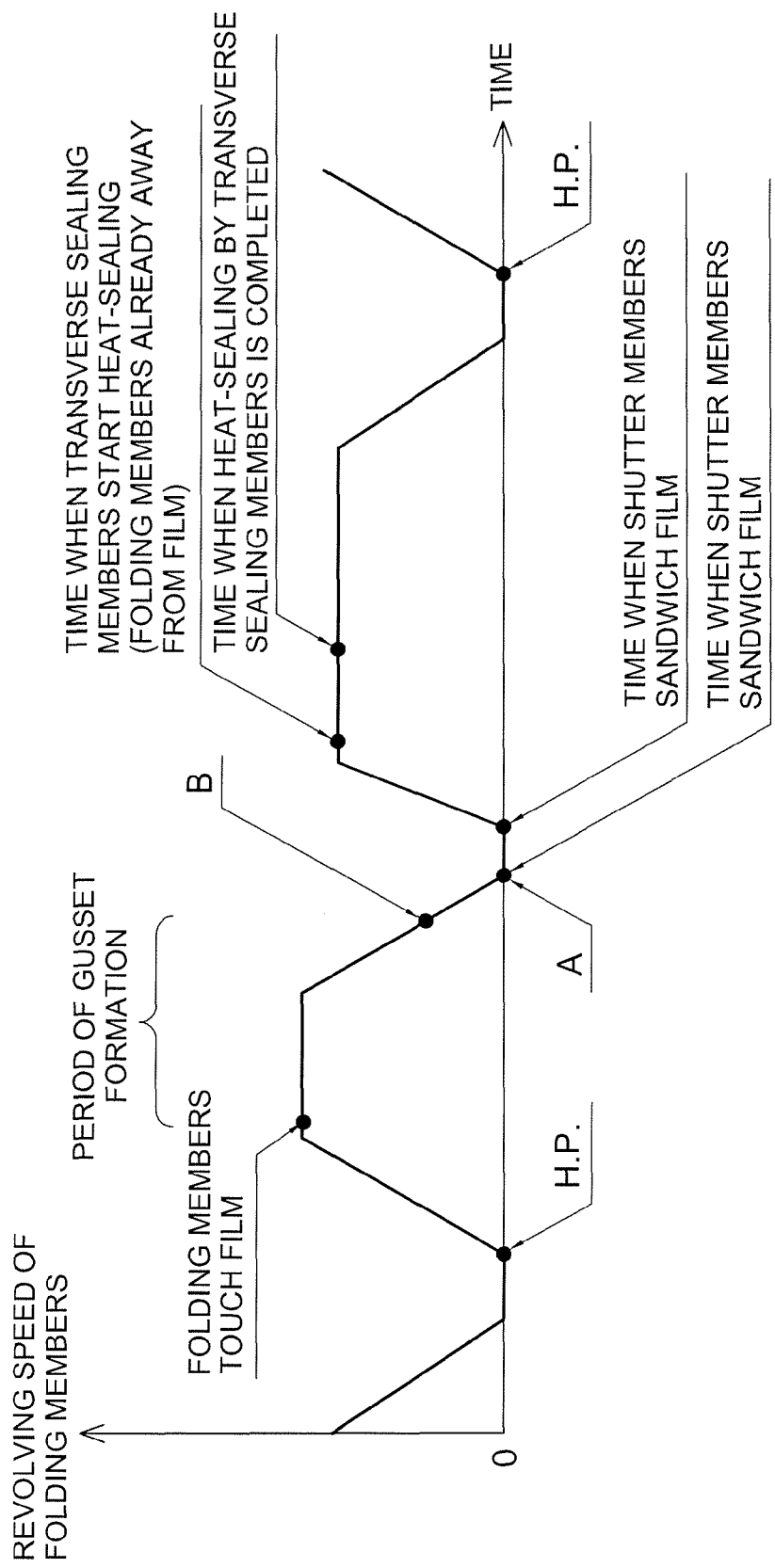
FIG. 19 is a graph showing an example of changes over time in the revolving speed of the folding members.

First, the control unit 40 performs interlocking control such that the gussets are formed in both side portions of the square tube-shaped film Fm by the folding members 18a and 18b before the shutter members 166 reach a first state shown in FIG. 17A. The first state is a state where the shutter members 166 prevent the entry of the product C from above into the space inside the transverse sealing target portion of the square tube-shaped film Fm. As shown in FIG. 19, the folding members 18a and 18b begin moving from their home positions (H.P.), touch both side portions of the square tube-shaped film Fm, and begin forming the gussets, but at this time, the shutter members 166 are not yet contacting the square tube-shaped film Fm. Around the time when the folding members 18a and 18b come closest to each other and reach point B, the shutter members 166 begin contacting the square tube-shaped film Fm, and around the time when the folding members 18a and 18b cross point B while decelerating and reach point A (see FIG. 10), the shutter members 166 reach the first state described above. When the shutter members 166 have reached the first state, the revolving speed of the folding members 18a and 18b becomes zero or a speed close to zero at point A.

Thereafter, a little after the shutter members 166, the pair of stripper members 155 reach the state where they sandwich the square tube-shaped film Fm (the state shown in FIG. 14A), but until that time, the state where the revolving speed of the folding members 18a and 18b is zero (or substantially zero) continues. That is, the folding members 18a and 18b maintain the state where they are contacting the square tube-shaped film Fm in which they have formed the gussets.

When the stripper members 155 reach the state where they sandwich the square tube-shaped film Fm, the folding members 18a and 18b begin revolving again and move away from the square tube-shaped film Fm while accelerating.

In parallel with that, the pair of stripper members 155 move downward at a faster speed than the square tube-shaped film Fm and begin the ironing operation. The clearance formed between the pair of stripper members 155 at this time is as shown in FIG. 16A, and, as described above, of the space inside the portions of the square tube-shaped film Fm touched by and sandwiched in the pair of stripper members 155, the second space S12 inside the central portion between both side portions of the square tube-shaped film Fm becomes larger than the first spaces S11 inside both side portions of the square tube-shaped film Fm in which the gussets have been formed. Consequently, the air that escapes from below to above travels mainly through the second space S12 rather than through the first spaces S11, and even when the folding members 18a and 18b are away from the square tube-shaped film Fm, there are virtually no situations where the gussets that have been formed in both side portions of the square tube-shaped film Fm lose their shape.

Thereafter, after the end of the ironing operation resulting from the stripper members 155, the pair of sealing jaws 51 press against each other as shown in FIG. 14B and FIG. 17B, and the transverse sealing target portion of the square tube-shaped film Fm sandwiched therebetween is heat-sealed. At this time, the folding members 18a and 18b have already revolvingly moved to positions where they are completely away from the square tube-shaped film Fm. Even when heat sealing by the sealing jaws 51 has ended, the folding members 18a and 18b continue to revolvingly move toward their home position (H.P.), thereafter decelerate, and stop in their home positions (H.P.) (see FIG. 19). Then, at the timing when the next gusset forming operation starts, the folding members 18a and 18b again accelerate and start revolving.

Characteristics of Bag Making and Packaging Machine 3

(1) The bag making and packaging machine 3 is a machine equipped with the pull-down belt mechanism 14 that continuously conveys the square tube-shaped film Fm. As shown in FIG. 7 and FIG. 8, the bag making and packaging machine 3 is also equipped with the transverse sealing mechanism 17 that uses the pair of sealing jaws 51 and 51 (or the sealing jaws 52 and 52) to perform transverse sealing and the gusset forming mechanism 18 that forms the gussets G in both side portions of the bags B that are to be made. As shown in FIG. 4 and FIG. 5B, the gusset forming mechanism 18 has the pair of folding members 18a and 18b that move at a speed close to the moving speed of the square tube-shaped film Fm in the regions where the folding members 18a and 18b contact the square tube-shaped film Fm, and the gusset forming mechanism 18 presses the folding members 18a and 18b against parts of the square tube-shaped film Fm.

Thus, even when the folding members 18a and 18b have been pressed against parts of the square tube-shaped film Fm that is continuously conveyed, the gussets G can be formed without causing large creases or the like to form in the square tube-shaped film Fm. As a result, excellent sealing performance can be ensured even when the gussets G are formed in the square tube-shaped film Fm that is continuously conveyed.

(2) In the bag making and packaging machine 3, as shown in FIG. 6 and the like, the gusset forming mechanism 18 causes the pair of folding members 18a and 18b to move along annular (circular) trajectories.

Thus, by setting the annular trajectories such that the folding members 18a and 18b move in the same direction as the conveyance direction of the square tube-shaped film Fm, the gussets G can be formed in both side portions while causing the folding members 18a and 18b to move in the same direction as the square tube-shaped film Fm.

(3) In the bag making and packaging machine 3, as shown in FIG. 6 and the like, the gusset forming mechanism 18 causes the pair of folding members 18a and 18b to move along circular trajectories. Here, the folding members 18a and 18b can be driven along the conveyance direction of the square tube-shaped film Fm by a relatively simple configuration and without the intervention of a complex mechanism or the like.

(4) In the bag making and packaging machine 3, before the transverse sealing processing, the pair of stripper members 155 move downward along the conveyance direction of the square tube-shaped film Fm at a faster speed than the square tube-shaped film Fm in a state where the stripper members 155 sandwich the square tube-shaped film Fm. Thus, the product C in the space inside the transverse sealing target portion of the square tube-shaped film Fm is driven into the space further below, and a phenomenon where the product C bites into the transverse sealing target portion is suppressed.

When the pair of stripper members 155 perform this so-called stripping operation (ironing operation), a deaeration phenomenon occurs where the air inside the square tube-shaped film Fm below the transverse sealing target portion escapes to the space inside the square tube-shaped film Fm above the transverse sealing target portion. In this deaeration phenomenon, the air escapes from below to above through the slight clearance inside the square tube-shaped film Fm sandwiched and held by the pair of stripper members 155. In ordinary bag making and packaging machines, oftentimes the air escaping in this deaeration phenomenon travels through both side portions of the tubular film. That is, in ordinary bag making and packaging machines, oftentimes members such as the second stripper members 159 shown in FIG. 16B are used rather than the stripper members 155 shown in FIG. 16A, the deaerating portion is made small in the place corresponding to the central portion of the tubular film (stripper central portion), and the deaerating portions are made large in the places corresponding to both side portions of the tubular film (stripper side portions). The reason for this is described in JP-A No. 2008-110800, for example.

However, when the gussets G are formed in both side portions of the square tube-shaped film Fm by the gusset forming mechanism 18, there is the fear that, in a machine using stripper members with a conventional shape such as the second stripper members 159, the gussets G that have been formed will end up collapsing because of the deaeration phenomenon in the stripping operation.

In view of this, in the bag making and packaging machine 3 pertaining to the embodiment described above, when the packaging material that becomes the target of the transverse sealing processing is the square tube-shaped film Fm where the gussets have been formed in both side portions, then the stripper members 155, by which a deaerating portion (the second space S12) that lets out air when the stripper members sandwich the square tube-shaped film Fm forms only in the central portion between both side portions of the square tube-shaped film Fm (the first packaging material), are used as the stripper members. That is, by using the stripper members 155 (see FIG. 15A and FIG. 16A) where the stripper central portions 155c1 are recessed away from the body portions 155c of the other stripper members 155 more than the stripper side portions 155c2, the phenomenon where the gussets G that have been formed end up collapsing because of the deaeration phenomenon in the stripping operation is prevented.

(5) In the transverse sealing mechanism 17 of the bag making and packaging machine 3, when the transverse sealing mechanism 17 transversely seals the square tube-shaped film Fm in which the gussets have been formed, it selectively uses the stripper members 155 with which it is difficult for the gussets to collapse, and when the transverse sealing mechanism 17 transversely seals the tubular film in which the gussets have not been formed, it selectively uses the second stripper members 159 that have conventionally been used. Thus, the bags B in which the gussets have been cleanly formed virtually without collapsing can be made from the square tube-shaped film Fm in which the gussets have been formed, and in regard to the tubular film in which the gussets have not been formed, bags in which conventional sealing performance is held can be made.

(6) In the bag making and packaging machine 3, as shown in FIG. 4, the motor 18c is installed as the drive source that drives the pair of folding members 18a and 18b included in the gusset forming mechanism 18. Thus, the moving speed (revolving speed) at each of the positions along the revolving trajectories of the folding members 18a and 18b can be varied by relatively simple control.

Additionally, this bag making and packaging machine 3 employs a configuration where the control unit 40 interlockingly controls the operation where the folding members 18a and 18b of the gusset forming mechanism 18 press against the square tube-shaped film Fm and the operation where the shutter members 166 and the sealing jaws 51 and 52 of the transverse sealing mechanism 17 touch the square tube-shaped film Fm and sandwich the square tube-shaped film Fm. Additionally, before the shutter members 166 reach the first state (the state shown in FIG. 17A where the pair of shutter members 166 sandwich the square tube-shaped film Fm with a minute clearance therebetween) where they exhibit their inherent function of preventing the entry of the product C from above into the space inside the transverse sealing target portion of the square tube-shaped film Fm, interlocking control where the gussets are formed in both side portions of the square tube-shaped film Fm by the folding members 18a and 18b is performed by the control unit 40.

Moreover, when the speed of bag making ends up being given priority, the operation where the shutter members 166 before the transverse sealing processing sandwich the square tube-shaped film Fm ends up temporally overlapping with the gusset forming operation resulting from the folding members 18a and 18b, and there is the fear that the gussets will be not formed appropriately because of air turbulence inside the square tube-shaped film Fm that arises when the shutter members 166 are sandwiching the square tube-shaped film F. In view of this, the bag making and packaging machine 3 is configured such that the control described above ends the operation of forming the gussets in both side portions of the square tube-shaped film Fm before the shutter members 166 reach the first state, to ensure that the gussets are cleanly formed.

Further, the transverse sealing mechanism 17 of the bag making and packaging machine 3 employs a configuration that has the stripper members 155 in addition to the sealing jaws 51 and 52 and the shutter members 166, and the members touch the square tube-shaped film Fm in the order of the shutter members 166, the stripper members 155, and the sealing jaws 51 and 52. Additionally, because of the control of the control unit 40, the folding members 18a and 18b of the gusset forming mechanism 18 that have already formed the gussets before the shutter members 166 sandwich the square tube-shaped film Fm maintain the state where they are contacting the square tube-shaped film Fm until the pair of stripper members 155 reach the state where they sandwich the square tube-shaped film F in the state where the pair of stripper members 155 are closest to each other. For this reason, situations where the gussets G that have been formed end up losing their shape because of air turbulence inside the square tube-shaped film Fm that arises because of the operation where the stripper members 155 sandwich the square tube-shaped film Fm virtually disappear. Thus, the gussets G are formed more cleanly.

(7) In the bag making and packaging machine 3, in regard to the folding members 18a and 18b that have already formed the gussets when the shutter members 166 have reached the first state, the revolving speed of those folding members 18a and 18b after the shutter members 166 have reached the first state temporarily becomes zero. Thus, in addition to the effect described above that it is difficult for the gussets to lose their shape because of the operation of the shutter members 166, the phenomenon where the gussets that have been formed end up collapsing because of air turbulence inside the square tube-shaped film Fm that arises because of the operation of the transverse sealing mechanism 17 after the shutter members 166 have reached the first state can be suppressed. This is because the folding members 18a and 18b that have formed the gussets continue to contact both side portions of the square tube-shaped film Fm in which the gussets have been formed.

Thus, problems such as gusset formation being inhibited or the gussets losing their shape after formation due to the series of operations of the transverse sealing mechanism 17 are suppressed, and the gussets G are cleanly formed in the bags B after transverse sealing.

The revolving speed of the folding members 18a and 18b after the shutter members 166 have reached the first state is not limited to zero. For example, by making the revolving speed slower than the revolving speed during gusset formation, the folding members 18a and 18b may be configured to stay on both side portions of the square tube-shaped film Fm during the period of time where there is the fear that the gussets will lose their shape.

(8) In the bag making and packaging machine 3, as shown in FIG. 7 and FIG. 8, thin-walled plate-like members are used as the pair of folding members 18a and 18b included in the gusset forming mechanism 18. Thus, the gussets G can be formed easily by inserting parts of the plate-like portions of the folding members 18a and 18b into both side portions of the square tube-shaped film Fm so as to press those parts of the plate-like portions of the folding members 18a and 18b against both side portions of the square tube-shaped film Fm.

The thin-plate members 13c that extend from the four corners of the lower end of the tube 13b are in height positions where the folding members 18a and 18b are pressed against both side portions of the square tube-shaped film Fm (see FIG. 9), and the gussets G are cleanly formed by the folding members 18a and 18b and by the four thin-plate members 13c.

Modification of Second Embodiment

In the embodiment described above, the conveyance speed of the square tube-shaped film Fm is constant, but in a bag making and packaging machine 3 pertaining to a modification, the conveyance speed is controlled to match the operations of the folding members 18a and 18b, the sealing jaws 51 and 52, and the stripper members 155.

Figure 21:
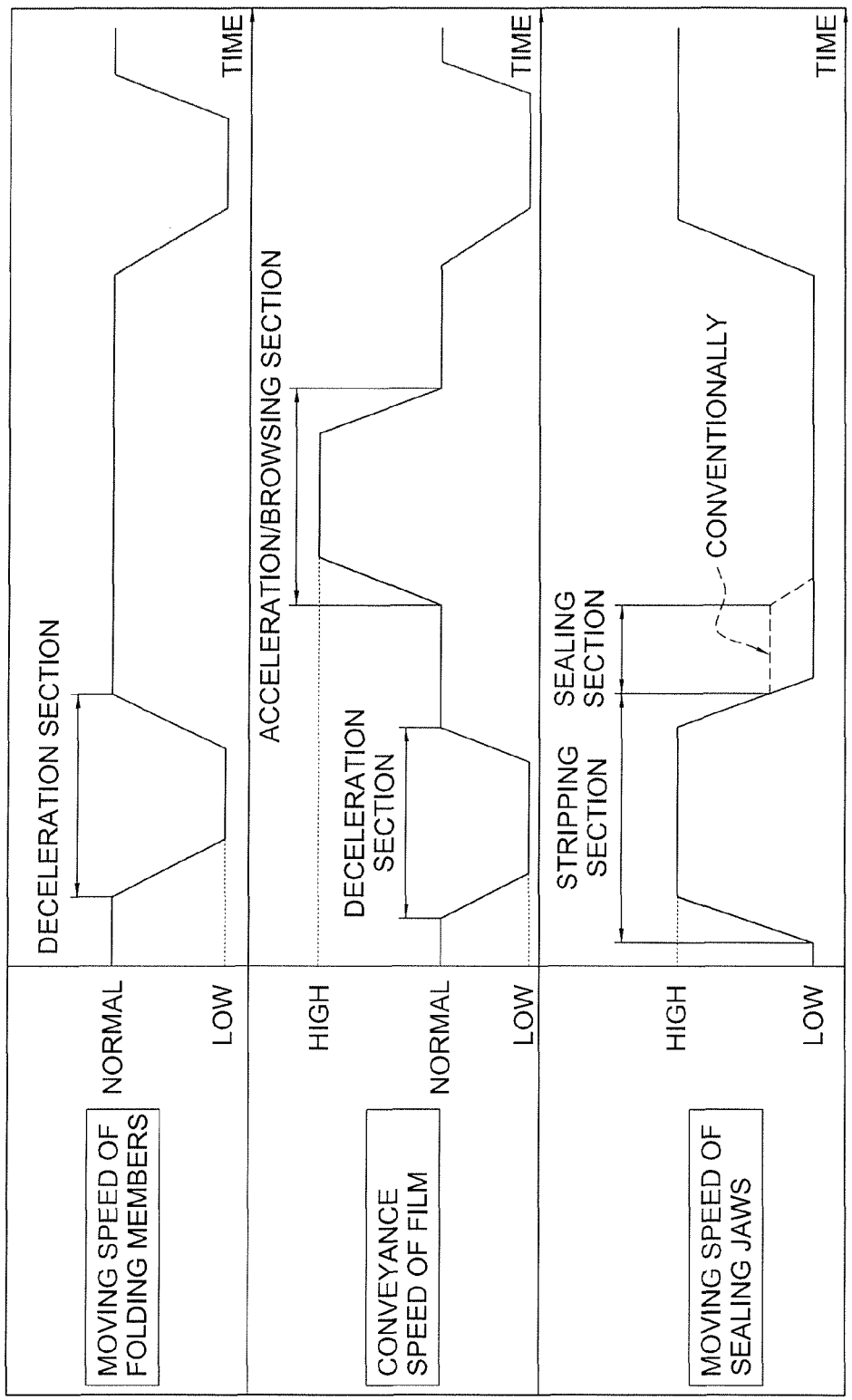
FIG. 21 is a graph showing changes in the speeds of the folding members, the film, and the sealing jaws of the bag making and packaging machine pertaining to the modification.

FIG. 21 is a graph showing changes in the speeds of each of the folding members, the film, and the sealing jaws of the bag making and packaging machine pertaining to the modification. In FIG. 7 and FIG. 21, the folding members 18a and 18b are decelerated and rotate at a low speed in the section where they are closest to each other. The control unit 40 (see FIG. 18) controls the pull-down belt mechanism 14 to lower the convenience speed of the film Fm in correspondence to the section where the folding members 18a and 18b decelerate.

Ordinarily, when the folding members 18a and 18b contact the film Fm, the speed component of the operating speed of the folding members in the conveyance direction of the film Fm is slower than the conveyance speed of the film Fm, so the contact between the folding members 18a and 18b and the film Fm becomes resistance for the film Fm, and it is easy for the film Fm to lose its shape. However, when the conveyance speed of the film Fm is lowered, the speed component of the operating speed of the folding members in the conveyance direction of the film Fm and the conveyance speed of the film Fm become closer to each other, so resistance when the folding members and the film Fm touch each other becomes smaller and shape loss of the film Fm is suppressed.

Further, the control unit 40 causes the sealing jaws 51 and 52 to move at a speed that is faster than the conveyance speed of the film Fm (about twice the ordinary conveyance speed) when the operating speed of the folding members 18a and 18b and the conveyance speed of the film Fm have been reduced. Thus, the speed component of the moving speed of the stripper members 155 in the conveyance direction of the film Fm also becomes fast. As a result, the film Fm is pulled downward, creases disappear, and gussets that reliably have folds are formed. Immediately after this, the film Fm undergoes transverse sealing processing in the state where it has been pulled by the stripper members 155, so the film Fm is sealed without tucks forming.

Further, as shown in FIG. 21, the control unit 40 makes the moving speed of the sealing jaws 51 and 52 in the sealing section lower than conventionally (indicated by the dotted line) and makes the speed component of the moving speed of the sealing jaws 51 and 52 in the conveyance direction of the film Fm slower than the conveyance speed of the film Fm. At this time, the area above the portion of the film Fm that has been undergone transverse sealing processing approaches the sealing jaws 51 and 52, is heated, and changes to an easily welded state. At the stage where the film Fm becomes made into the bags B and the bags B are sequentially discharged, the surface that has changed to that easily welded state and one surface of the portion that has undergone transverse sealing processing firmly stick to each other such that a planar region is formed. When the bags B are arranged on a display shelf, those planar regions stabilize the bags B and allow the bags B to be stood upright, so the effect that the bags B will attract consumers is high in comparison to bags that cannot be stood upright.

Other Modifications

The bag making and packaging machine 3 pertaining to the second embodiment of the present invention and the modification has been described above, but various changes are possible in a scope that does not depart from the gist of the present invention.

(A) In the bag making and packaging machine 3 described above, both of the pair of stripper members 155 are stripper members where the cutout 155d is formed in the central portion of the body portion 155c, but the bag making and packaging machine 3 may also employ a pair of stripper members where the cutout 155d is formed in at least one. This is because, in this case also, of the space inside the portions of the square tube-shaped film Fm touched by the stripper members, the second space inside the central portion between both side portions of the square tube-shaped film Fm becomes larger than the first spaces inside both side portions of the square tube-shaped film Fm in which the gussets have been formed.

(B) In the bag making and packaging machine 3 described above, the folding members 18a and 18b included in the gusset forming mechanism 18 move along circular trajectories and form the gussets G in the square tube-shaped film Fm. However, the present invention is not limited to this.

The shape of the trajectories on which the folding members move is not limited to being circular and may also, for example, be a substantially quadrangular box shape, a substantially triangular shape, or a substantially elliptical shape.

(C) In the bag making and packaging machine 3 described above, the pair of folding members 18a and 18b are driven by a single drive source (the motor 18c). However, the present invention is not limited to this.

For example, the bag making and packaging machine 3 may also have a configuration where the pair of folding members 18a and 18b are caused to move using separate drive sources respectively.

(D) In the bag making and packaging machine 3 described above, the motor 18c is used as the drive source that drives the pair of folding members 18a and 18b. However, the present invention is not limited to this.

For example, various actuators such as an air cylinder can be used as the drive source that drives the folding members.

(E) In the bag making and packaging machine 3 described above, substantially L-shaped thin-walled plate-like materials are used as the folding members 18a and 18b. However, the present invention is not limited to this.

For example, in regard to the shape of the folding members, it is possible to use members having a certain extent of thickness or members having various shapes.

(F) In the description relating to the bag making and packaging machine 3 described above, the height positions of the folding members 18a and 18b when the shutter members 166 have reached the first state shown in FIG. 17A are not clearly specified, but if the bag making and packaging machine can employ a structure where the transverse sealing mechanism 17 and the gusset forming mechanism 18 do not interfere with each other, it is desirable for the positions of the lower ends of the folding members 18a and 18b to be as low as possible.

Figure 20:
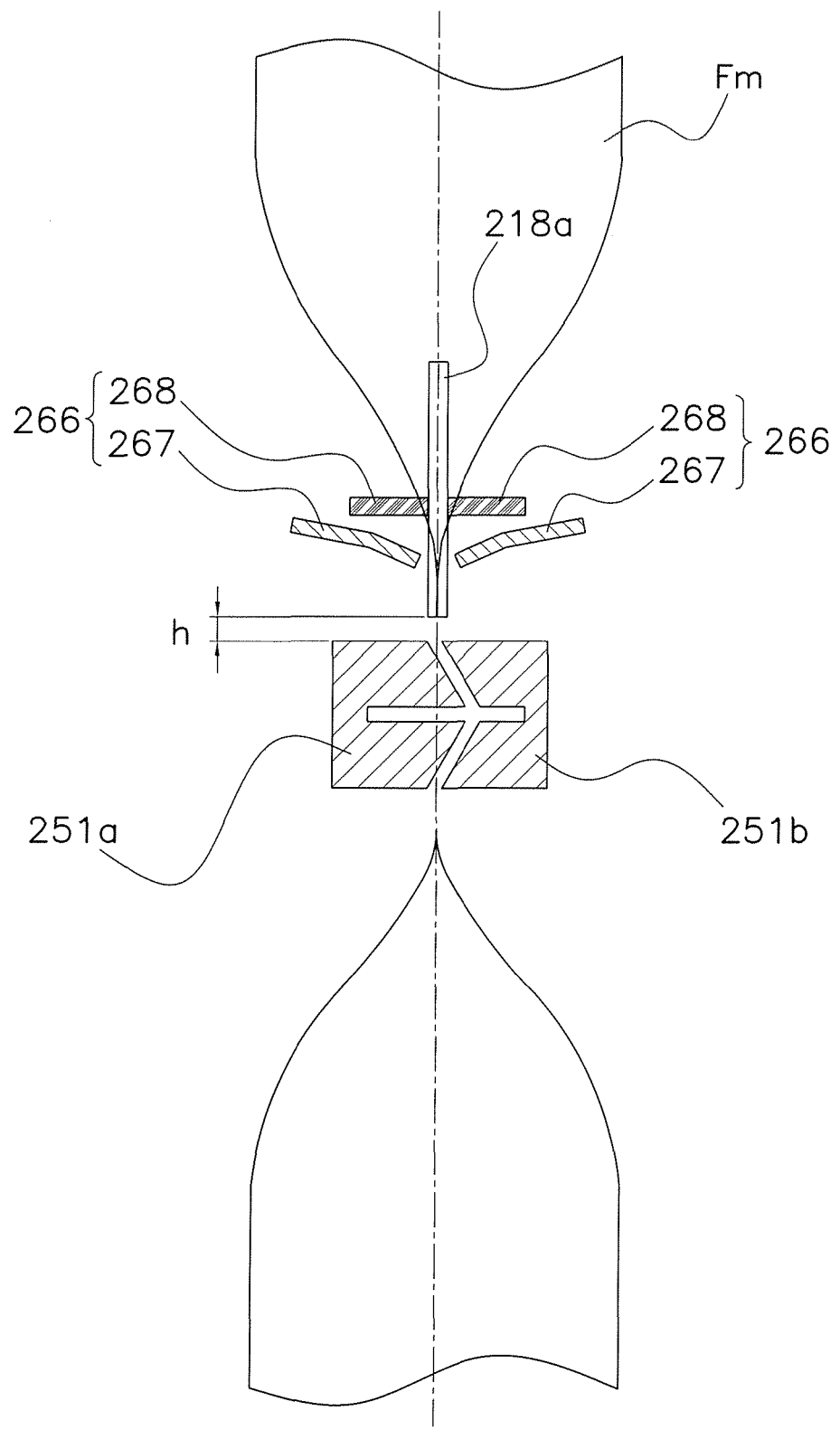
FIG. 20 is a view of the relative placement of height positions of shutter members and folding members of a modification.

For example, when the relative positional relationship in the height direction of a pair of shutter members 266 and 266, a pair of sealing jaws 251a and 251b, and folding members 218a shown in FIG. 20 can be realized, it is desirable to realize this relative positional relationship. Here, when the pair of shutter members 266 and 266 reach a state where they sandwich the square tube-shaped film Fm and prevent the entry of the product C from above into the space inside the transverse sealing target portion, the lower ends of the folding members 218a are in positions that are lower than the positions where the pair of shutter members 266 and 266 touch the square tube-shaped film Fm, and a distance h in the height direction between the lower ends of the folding members 218a and the upper surfaces of the pair of sealing jaws 251 and 251b is extremely small. This distance h in the height direction is preferably equal to or less than 10 mm and more preferably equal to or less than 5 mm. If the folding members 218a are in positions this close to the sealing jaws 251a and 251b when seen from the side, situations where the gusset formation processing is adversely affected or where the gussets that have been formed lose their shape because of the movement of the pair of shutter members 266 and 266 in the series of transverse sealing operations or the like virtually disappear.

The reason both opposing surfaces of the pair of sealing jaws 251a and 251b are slanted is because, by slanting the transverse seal portion slightly with respect to a vertical plane, the bottoms of the bags that are finished come to have shapes close to flat.

Further, the pair of shutter members 266 and 266 in FIG. 20 have a pair of body portions 267 and 267 that are rigid bodies and a pair of auxiliary portions 268 and 268 that are elastic bodies. The body portions 267 are thin-plate members made of metal. The auxiliary portions 268 are brushes, and the surfaces of the brushes that touch the square tube-shaped film Fm comprise the distal ends of numerous brush hairs. The dimension of the clearance between the pair of body portions 267 and 267 is larger than the thickness dimension of the folding members 218a. The dimension of the clearance between the pair of auxiliary portions 268 and 268 is smaller than the thickness dimension of the folding members 218a. However, because the distal ends of the brush hairs of the auxiliary portions 268 bend, the pair of auxiliary portions 268 and 268 can approach each other closely even when the folding members 218a are present. In this manner, in the example shown in FIG. 20, the bag making and packaging machine 3 employs the shutter members 266 and 266 equipped with the pair of auxiliary portions 268 and 268, so it becomes possible to hold the lower ends of the folding members 218a in positions that are lower than the lower ends of the pair of shutter members 266 and 266.

(G) In the bag making and packaging machine 3 described above, when the stripper members 155 reach the state where they sandwich the square tube-shaped film Fm, the folding members 18a and 18b begin revolving again and move away from the square tube-shaped film Fm while accelerating.

This is because the bag making and packaging machine 3 employs, as the stripper members, the stripper members 155 where, of the space inside the portions of the square tube-shaped film Fm touched by the stripper members, the second space S12 inside the central portion between both side portions of the square tube-shaped film Fm becomes larger than the first spaces S11 inside both side portions of the square tube-shaped film Fm in which the gussets have been formed, and in the ironing operation, a deaerating portion (the second space S12) that lets out air when the stripper members sandwich the square tube-shaped film Fm forms only in the central portion between both side portions of the square tube-shaped film Fm.

However, when the bag making and packaging machine 3 uses stripper members such as the second stripper members 159 that have conventionally been around rather than the stripper members 155 with respect to the square tube-shaped film Fm in which it forms gussets, during the period of time of the ironing operation also, it is desirable to cause the folding members 18a and 18b to continue to contact both side portions of the square tube-shaped film Fm for as long a time as possible. Consequently, in this case, it is preferable for the bag making and packaging machine 3 to perform control so as to cause the folding members 18a and 18b to contact the square tube-shaped film Fm until the transverse sealing operation resulting from the sealing jaws 51 begins and such that the folding members 18a and 18b move away from the square tube-shaped film Fm immediately before the transverse sealing operation begins.

The bag making and packaging machine of any of the illustrated embodiments achieves the effect that, even when a gusset forming mechanism is installed in a bag making and packaging machine that performs bag making processing while continuously conveying a packaging material, it can avoid a situation where the sealing performance of transverse seal portions or the like ends up deteriorating while the machine efficiently performs bag making processing. Thus, the bag making and packaging machine of any of the illustrated embodiments is widely applicable to various machines and devices that make bags that have gussets.

The invention claimed is:

1. A bag making and packaging machine comprising:
a conveying unit configured and arranged to continuously convey a tubular packaging material;
a transverse sealing mechanism having a pair of sealing jaws configured and arranged to revolvingly move while following annular loci to seal the tubular packaging material in a transverse direction with respect to a conveyance direction of the tubular packaging material, the transverse sealing mechanism further having shutter members configured and arranged to touch the tubular packaging material before the sealing jaws touch the tubular packaging material to prevent entry of contents from above into a space inside a transverse sealing target portion of the tubular packaging material at which the tubular packaging material is sealed by the sealing jaws immediately after the shutter members touch the tubular packaging material;
a gusset forming mechanism having a pair of folding members configured and arranged to be pressed against side portions of the tubular packaging material to form gussets in the side portions of the tubular packaging material while the folding members move along the conveyance direction of the tubular packaging material before the transverse sealing mechanism seals the tubular packaging material, the gusset forming mechanism being configured and arranged to annularly move each of the folding members and parts supporting each of the folding members, the gusset forming mechanism further being configured and arranged to revolvingly move each of the folding members so as to match a conveyance speed of the tubular packaging material while revolvingly moving them along the conveyance direction on the tubular packaging material continuously conveyed when forming the gussets, lower ends of the folding members are positioned lower than the shutter members when the shutter members have reached the first state; and a control unit configured to control operations of the transverse sealing mechanism and the gusset forming mechanism, the control unit being configured to control the operation of the transverse sealing mechanism and the operation of the gusset forming mechanism so that the gussets are formed in the side portions of the tubular packaging material by the folding members before the shutter members reach a first state where the shutter members prevent entry of the contents from above into the space inside the transverse sealing target portion of the tubular packaging material.

2. The bag making and packaging machine according to claim 1, wherein
the gusset forming mechanism is configured and arranged to move the folding members along circular trajectories.

3. The bag making and packaging machine according to claim 1, wherein
when the folding members are contacting the tubular packaging material, the gusset forming mechanism is configured and arranged to move the folding members at a speed that is substantially equal to or slightly faster than a conveyance speed of the tubular packaging material.

4. The bag making and packaging machine according to claim 1, wherein
the gusset forming mechanism further has a servo motor configured and arranged to drive the folding members, and the gusset forming mechanism is configured and arranged to vary an angular velocity of the servo motor between when the folding members are contacting the tubular packaging material and when the folding members are not contacting the tubular packaging material.

5. The bag making and packaging machine according to claim 1, wherein
the gusset forming mechanism is configured and arranged to move the folding members away from the tubular packaging material when the sealing jaws seal the tubular packaging material in the transverse sealing mechanism.

6. The bag making and packaging machine according to claim 1, wherein
the folding members include thin plate-shaped members.

7. The bag making and packaging machine according to claim 1, wherein
the transverse sealing mechanism further has a pair of stripper members configured and arranged to touch the tubular packaging material at substantially the same time as or after the shutter members touch the tubular packaging material, and before the sealing jaws touch the tubular packaging material, and to move along the conveyance direction of the tubular packaging material at a faster speed than a conveyance speed of the tubular packaging material before the sealing jaws seal the tubular packaging material, and
the control unit is configured to control the operation of the transverse sealing mechanism and the operation of the gusset forming mechanism so as to maintain a state where the folding members that press against and have formed the gussets in the side portions of the tubular packaging material are contacting the tubular packaging material at least until the stripper members reach a state where they sandwich the tubular packaging material in a state where the stripper members are closest to each other.

8. The bag making and packaging machine according to claim 7, wherein
at least a part of one of the stripper members is recessed away from the other one of the stripper members at a portion corresponding to a central portion between the side portions of the tubular packaging material than portions that press against the side portions and the vicinity thereof of the tubular packaging material in which the gussets are formed.

9. The bag making and packaging machine according to claim 1, wherein
the folding members are configured and arranged to revolvingly move while following annular loci separate from those of the sealing jaws, and
the control unit is configured to set revolving speeds of the folding members after the shutter members have reached the first state to zero or a value smaller than the revolving speed of the folding members when the folding members are forming the gussets in the side portions of the tubular packaging material.

10. The bag making and packaging machine according to claim 1, wherein
the lower ends of the folding members and the sealing jaws become as close to each other as 10 mm or less when the shutter members have reached the first state.

11. The bag making and packaging machine according to claim 1, wherein
the shutter members have a pair of body portions that are rigid bodies and a pair of auxiliary portions that are elastic bodies, and
in the first state, the body portions sandwich the tubular packaging material including the side portions of the tubular packaging material that the folding members are touching in a state where there is a clearance between the body portions that is larger than a thickness dimension of the folding members while the auxiliary portions sandwich the tubular packaging material so as to press against the folding members.

12. The bag making and packaging machine according to claim 1, wherein
the control unit is configured to lower the conveyance speed of the tubular packaging material via the conveying unit around a point in time when the folding members contact the tubular packaging material.

13. The bag making and packaging machine according to claim 12, wherein
the transverse sealing mechanism further has a pair of stripper members configured and arranged to touch the tubular packaging material at substantially the same time as or after the shutter members touch the tubular packaging material, and before the sealing jaws touch the tubular packaging material, and to move along the conveyance direction of the tubular packaging material at a faster speed than a conveyance speed of the tubular packaging material before the sealing jaws seal the tubular packaging material.

14. The bag making and packaging machine according to claim 13, wherein
the control unit is configured to set a speed of the sealing jaws along the conveyance direction of the tubular packaging material slower than the conveyance speed of the tubular packaging material when the sealing jaws seal the tubular packaging material.

15. The bag making and packaging machine according to claim 1, wherein
the folding members have
first surfaces configured and arranged to press against the side portions of the tubular packaging material,
second surfaces disposed adjacent to the first surfaces and diagonally oppose the tubular packaging material immediately before the sealing jaws start sealing the tubular packaging material, and
air blowout ports formed in the first surfaces and in the second surfaces, with air being blown out from the air blowout ports when the folding members form the gussets in the side portions of the tubular packaging material.

16. The bag making and packaging machine according to claim 15, wherein
the folding members further have heaters fixed onto surfaces on opposite sides of the first surfaces to heat the folding members.

17. The bag making and packaging machine according to claim 1, wherein
the folding members have
first surfaces configured and arranged to press against the side portions of the tubular packaging material,
second surfaces disposed adjacent to the first surfaces and diagonally oppose the tubular packaging material immediately before the sealing jaws start sealing the tubular packaging material, and
heaters fixed onto surfaces on opposite sides of the first surfaces to heat the folding members.

18. The bag making and packaging machine according to claim 1, wherein
each of the pair of folding members including a plate-like member having a first surface, each of the first surfaces being straight, the folding members being configured and arranged such that the first surfaces are pressed against side portions of the tubular packaging material to form gussets in the side portions of the tubular packaging material while the folding members move along the conveyance direction of the tubular packaging material before the transverse sealing mechanism seals the tubular packaging material.

* * * * *